United States Patent
Liu

(10) Patent No.: US 12,450,187 B2
(45) Date of Patent: Oct. 21, 2025

(54) METHOD FOR EXPANDING PCIe SYSTEM, PCIe SWITCHING DEVICE, AND PCIe SYSTEM

(71) Applicant: HUAWEI TECHNOLOGIES CO., LTD., Guangdong (CN)

(72) Inventor: Xingqiang Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/150,991

(22) Filed: Jan. 6, 2023

(65) Prior Publication Data

US 2023/0161728 A1     May 25, 2023

Related U.S. Application Data

(63) Continuation of application No. PCT/CN2021/102622, filed on Jun. 28, 2021.

(30) Foreign Application Priority Data

Jul. 13, 2020 (CN) .......................... 202010677632.7
Dec. 30, 2020 (CN) .......................... 202011620807.7

(51) Int. Cl.
    *G06F 13/24*            (2006.01)
    *G06F 13/42*            (2006.01)

(52) U.S. Cl.
    CPC .. *G06F 13/4221* (2013.01); *G06F 2213/0026* (2013.01)

(58) Field of Classification Search
    CPC ......... G06F 13/4221; G06F 2213/0026; G06F 13/4022
See application file for complete search history.

(56) References Cited

U.S. PATENT DOCUMENTS

| | | | |
|---|---|---|---|
| 8,917,734 B1 * | 12/2014 | Brown .................... | H04L 49/35 370/400 |
| 11,106,616 B1 * | 8/2021 | Wu ....................... | G06F 13/4221 |
| 2012/0036306 A1 | 2/2012 | Miyoshi | |
| 2012/0066428 A1 | 3/2012 | Miyoshi | |
| 2018/0052793 A1 * | 2/2018 | Fang ..................... | G06F 13/385 |
| 2018/0101498 A1 * | 4/2018 | Cosby ................. | G06F 13/4282 |
| 2023/0161728 A1 * | 5/2023 | Liu ...................... | G06F 13/4022 710/105 |

FOREIGN PATENT DOCUMENTS

CN      105531684 A      4/2016

OTHER PUBLICATIONS

PCI Express Base Specification, Rev. 4.0 Version 1.0, Sep. 27, 2017, Total 1293 Pages.

\* cited by examiner

*Primary Examiner* — Henry Tsai
*Assistant Examiner* — Kim T Huynh

(57) ABSTRACT

A PCIe switching device includes an upstream port, a port agent apparatus, and a plurality of first downstream ports. The upstream port is connected to the port agent apparatus, which is connected to the plurality of first downstream ports. Each first downstream port is configured to connect to a PCIe endpoint device. Links between the plurality of first downstream ports and PCIe endpoint devices connected to the plurality of first downstream ports share a same bus number.

27 Claims, 12 Drawing Sheets

| 32-bit/64-bit address window of an upstream port of a PCIe switching device [A,Z] | |
|---|---|
| 32-bit/64-bit address window of a DPA of the PCIe switching device [A,Y] | 32-bit/64-bit address window of a downstream port DP_m of the PCIe switching device [Y,Z] |
| 32-bit/64-bit address window of DP_0 for which the DPA of the PCIe switching device acts as an agent [A,B] | 32-bit/64-bit address window of DP_1 for which the DPA of the PCIe switching device acts as an agent [B,C] | 32-bit/64-bit address window of DP_m-1 for which the DPA of the PCIe switching device acts as an agent [X,Y] |
| 32-bit/64-bit address range of EP_0 [A,B] | 32-bit/64-bit address range of EP_1 [B,C] | 32-bit/64-bit address range of EP_m-1 [X,Y] |

FIG. 10

METHOD FOR EXPANDING PCIe SYSTEM, PCIe SWITCHING DEVICE, AND PCIe SYSTEM

CROSS-REFERENCE TO RELATED APPLICATIONS

This application is a continuation of International Application PCT/CN2021/102622, filed on Jun. 28, 2021, which claims priority to Chinese Patent Application No. 202010677632.7, filed on Jul. 13, 2020, and Chinese Patent Application No. 202011620807.7, filed on Dec. 30, 2020. All of the aforementioned priority patent applications are hereby incorporated by reference in their entirety.

TECHNICAL FIELD

This application relates to the field of computer technologies, and in particular, to a method for expanding a PCIe system, a PCIe switching device, and a PCIe system.

BACKGROUND

The peripheral component interconnect bus (peripheral component interconnect express, PCIe) is a high-speed serial computer expansion bus standard, and is configured to implement a connection between a processor and external devices. These external devices are referred to as PCIe devices.

A PCIe protocol uses a 32-bit PCIe ID to identify a PCIe device in a system. The 32 bits include domain(16bits):bus (8bits):device(5bits).function(3bits). The 8-bit bus identity (bus ID), 5-bit device identity (device ID), and 3-bit function identity (function ID) are referred to BDF for short. The bus ID provides 256 bus numbers for each PCIe domain. Usually, a computer system supports only one PCIe domain. In other words, the entire computer system provides only 256 bus numbers. Because the PCIe protocol is a peer-to-peer connection, a quantity of PCIe devices that can be supported by one PCIe domain is limited by the 256 bus numbers, and more PCIe devices cannot be supported by the PCIe domain.

SUMMARY

This application provides a method for expanding a PCIe system, a PCIe switching device, and a PCIe system, to resolve a problem that a quantity of PCIe devices is limited by 256 bus numbers in the conventional technology.

According to a first aspect, this application provides a PCIe switching device. The PCIe switching device includes an upstream port, a port agent apparatus, and a plurality of first downstream ports. The upstream port is connected to the port agent apparatus, the port agent apparatus is connected to the plurality of first downstream ports, and the first downstream port is configured to connect to a PCIe endpoint device. Links between the plurality of first downstream ports and PCIe endpoint devices connected to the plurality of first downstream ports share a same bus number.

The switching device in the first aspect includes the port agent apparatus. The port agent apparatus is connected to the plurality of first downstream ports, and provides an agent for the plurality of first downstream ports. When the links between the plurality of first downstream ports and the PCIe endpoint devices connected to the plurality of first downstream ports share the same bus number, a quantity of bus numbers occupied by the PCIe endpoint devices is reduced, and a capacity of a PCIe system is improved.

In a possible implementation, a secondary bus number of the port agent apparatus is equal to a subordinate bus number. The subordinate bus number is used to represent a largest bus number in a PCIe subtree under the port agent apparatus.

In another possible implementation, the PCIe switching device further includes one or more second downstream ports. The one or more second downstream ports are connected to the upstream port. The second downstream port is connected to the upstream port, and the port agent apparatus does not need to provide an agent service.

In an enumeration process, system enumeration software (for example, a basic input output system/operating system (Basic Input Output System/Operating System, BIOS/OS)) allocates BDF to a PCIe device (including a bridge device and an endpoint device) of the PCIe system. A bus number of a management topology of the bridge device includes a primary bus number (Primary Bus Number), a secondary bus number (Secondary Bus Number), and a subordinate bus number (Subordinate Bus Number). After the enumeration is completed, the secondary bus number of the port agent apparatus is equal to the subordinate bus number.

In another possible implementation, a secondary bus number of the port agent apparatus may be less than a subordinate bus number, and a value obtained by subtracting the secondary bus number from the subordinate bus number is less than a quantity of the first downstream ports. In this case, some of the plurality of first downstream ports share a same secondary bus number.

In another possible implementation, the port agent apparatus and the plurality of first downstream ports have a same subordinate bus number. Specifically, the port agent apparatus sets bus numbers of management topologies of the plurality of first downstream ports under the port agent apparatus to be the same as a bus number of a management topology of the port agent apparatus.

In another possible implementation, a number of the first downstream port is used to indicate a device identity of the PCIe endpoint device connected to the first downstream port. A processor may use an identity of the first downstream port connected to the PCIe endpoint device to distinguish endpoint devices under the port agent apparatus. The processor identifies the PCIe endpoint device based on the number of the first downstream port, a bus number D, and a function number F.

In another possible implementation, the port agent apparatus is configured to: receive, from the first downstream port, a data packet sent by the PCIe endpoint device, and replace a device identity in the data packet with the number of the first downstream port.

When the data packet sent by the PCIe endpoint device is a request TLP packet, the port agent apparatus is specifically configured to replace, with the number of the first downstream port connected to the PCIe endpoint device, a device identity in requester BDF carried in the request TLP packet.

Alternatively, when the data packet sent by the PCIe endpoint device is a completion TLP packet, the port agent apparatus is specifically configured to replace, with the number of the first downstream port connected to the PCIe endpoint device, a device identity in completer BDF carried in the completion TLP packet.

In another possible implementation, the port agent apparatus is configured to: receive a data packet sent by the processor, use a value of a device identity in the data packet as a number of a destination port that receives the data packet, change the device identity in the data packet to 0, and send the data packet to the destination port.

When the data packet sent by the processor is a configuration request TLP packet, a device identity in destination BDF carried in the configuration request TLP packet is replaced with 0.

Alternatively, when the data packet sent by the processor is a completion TLP packet, a device identity in requester BDF carried in the completion TLP packet is replaced with 0.

The configuration request TLP packet includes a configuration write request TLP packet and a configuration read request TLP packet.

In this implementation, in an enumeration process of the processor, the device identity of the PCIe endpoint device connected to the first downstream port is replaced with the number of the first downstream port. In the conventional technology, a device identity allocated by a PCIe system to a PCIe endpoint device is generally 0. In embodiments of this application, to avoid an impact on the PCIe endpoint device, the port agent apparatus changes, to 0, the device identity in the data packet sent to the PCIe endpoint device, so that the PCIe endpoint device does not need to change a software configuration for the solutions of this application.

In another possible implementation, configuration space registers of all first downstream ports belonging to the port agent apparatus are mapped in a configuration space register of the port agent apparatus. The port agent apparatus accesses the configuration space register of the first downstream port after the configuration space register of the first downstream port is mapped to the configuration space register of the port agent apparatus.

In another possible implementation, a value of an enable register of the port agent apparatus is used to indicate whether an agent function of the port agent apparatus is enabled. The enable register enables the PCIe switching device to enable or disable an agent function. When the agent function is enabled, the solutions of this application are implemented. When the agent function is disabled, the PCIe switching device serving as a conventional PCIe switching device provides a service by using the conventional technology.

Specifically, when the PCIe switching device is powered on or reset for initialization, the PCIe switching device sets the register of the port agent apparatus by using firmware or by reading a nonvolatile memory (for example, an electrically erasable programmable read-only memory (EEPROM)).

In another possible implementation, the port agent apparatus is configured to receive a first configuration request forwarded by the upstream port, and the first configuration request carries each bus number corresponding to a management topology of the port agent apparatus.

The port agent apparatus is further configured to: set, based on the first configuration request, each bus number corresponding to the management topology of the port agent apparatus, and set management topologies of all first downstream ports connected to the port agent apparatus to a same bus number.

Each first downstream port under the port agent apparatus is set to have a same bus number of a management topology as the port agent apparatus, so that the port agent apparatus acts as an agent for all first downstream ports under the port agent apparatus, and simulates all first downstream ports under the port agent apparatus as one agent port for an upper-layer system.

In another possible implementation, the port agent apparatus is configured to receive a second configuration request sent by the processor. A bus number carried in the second configuration request is a secondary bus number of the port agent apparatus, a carried device identity is m, and m is an integer greater than or equal to 0. The port agent apparatus is further configured to route the second configuration request to a corresponding destination port based on the value m of the device identity carried in the second configuration request. A number of the destination port is equal to m.

In this implementation, the processor may enumerate all first downstream ports under the port agent apparatus to the system by adjusting the value of m.

In another possible implementation, the PCIe switching device further includes one or more second downstream ports. The port agent apparatus is configured to: determine, based on a port enabling record, that an agent function is enabled for the plurality of first downstream ports, and determine that an agent function is not enabled for the one or more second downstream ports. The port enabling record may be recorded in a bitmap register, and a bitmap value that corresponds to each downstream port of the PCIe switching device and that is recorded in the bitmap register is used to indicate whether an agent function is enabled for an endpoint device connected to each downstream port. The port enabling record may also be a mapping table.

In another possible implementation, an address window of the port agent apparatus is a collection of address windows of all first downstream ports connected to the port agent apparatus. When receiving a data packet using an address routing manner, the port agent apparatus may determine, based on the address window, whether the data packet belongs to an address range of the first downstream port under the port agent apparatus. When an address addressed by the processor belongs to a range of the address window of the port agent apparatus, the port agent apparatus performs an addressing operation of the corresponding address.

In another possible implementation, the port agent apparatus is further configured to: receive a message packet reported by the first downstream port connected to the port agent apparatus, replace, with BDF of the port agent apparatus, BDF of the first downstream port that is carried in the message packet, and route the message packet to the upstream port.

Further, the message packet includes an error packet. The error packet carries error information of the first downstream port.

When the message packet is an error packet, the port agent apparatus is further configured to record state information of the first downstream port that sends the error packet.

The message packet further includes an interruption packet.

In this implementation, the port agent apparatus modifies the BDF in the message packet sent by the first downstream port, so that the first downstream port is invisible to an upper-layer system.

In another possible implementation, a sum of a quantity of bits in the device identity and a quantity of bits in a function identity of the PCIe endpoint device is 8.

In another possible implementation, the PCIe switching device is an application-specific integrated circuit (Application-Specific Integrated Circuit, ASIC) chip.

In another possible implementation, the PCIe switching device includes a plurality of parallel port agent apparatuses, and each port agent apparatus is connected to one group of the first downstream ports. Each port agent apparatus provides an agent service for a group of first downstream ports under the port agent apparatus, and a secondary bus number of a first downstream port in each group is different from a secondary bus number of a first downstream port in another group.

According to a second aspect, this application provides another PCIe switching device, including a processor, a memory, an upstream port, and a plurality of first downstream ports. The memory stores instructions. When executing the instructions, the processor implements functions of the port agent apparatus according to the first aspect.

According to a third aspect, this application provides a PCIe system, including a processor and the PCIe switching device.

In a possible implementation, the PCIe switching device includes a first PCIe switching device and a second PCIe switching device. An upstream port of the second PCIe device is connected to a second downstream port of the first switching device, and an agent function is not enabled for the second downstream port.

According to a fourth aspect, this application provides another PCIe system. The PCIe system includes a first PCIe switching device and a second PCIe switching device. The first PCIe switching device is the PCIe switching device in the first aspect. The second PCIe switching device is a conventional PCIe switching device. To be specific, the second PCIe device does not include a port agent apparatus. The second PCIe switching device is an upstream or downstream device of the first PCIe switching device.

According to a fifth aspect, this application provides a processor chip. The processor chip includes a root complex (RC) and the PCIe switching device according to the foregoing aspects. An upstream port of the PCIe switching device is connected to a root port of the root complex (RC). The PCIe switching device is configured to implement functions of the PCIe switching device in the foregoing aspects.

According to a sixth aspect, this application provides a method for expanding a PCIe system. The PCIe system includes a processor and a PCIe switching device. The PCIe switching device includes an upstream port, a port agent apparatus, and a plurality of first downstream ports.

The port agent apparatus is connected to the processor by using the upstream port, the port agent apparatus is connected to the plurality of first downstream ports, and the first downstream port is configured to connect to a PCIe endpoint device.

The method includes:

The processor, by using the port agent apparatus, sets links between the plurality of first downstream ports and PCIe endpoint devices connected to the plurality of first downstream ports to a same bus number.

Specifically, system enumeration software enumerates the PCIe endpoint devices in the PCIe system, and sets, in an enumeration process, bus numbers of links between the plurality of first downstream ports and the PCIe endpoint devices under the plurality of first downstream ports.

According to a seventh aspect, this application provides a computer program product. The computer program product includes a computer program stored in a computer-readable storage medium, and the computer program is loaded by a processor to implement instructions of functions according to the first aspect or any possible implementation of the first aspect.

According to an eighth aspect, this application provides a computer-readable storage medium, configured to store a computer program. The computer program is loaded by using a processor, to implement functions according to any one of the foregoing aspects or the possible implementations of the aspects.

BRIEF DESCRIPTION OF DRAWINGS

FIG. 2 is a schematic diagram of a PCIe device management topology corresponding to FIG. 1;

FIG. 10 is a schematic diagram of address window allocation according to an embodiment of this application;

DESCRIPTION OF EMBODIMENTS

The following further describes in detail embodiments of this application with reference to the accompanying drawings.

As a local bus of a processor system, a PCIe bus has a function similar to that of a PCI bus, and is mainly used to connect to an external device in the processor system. The PCIe bus uses a peer-to-peer connection manner. Only one device can be connected to each of two ends of a PCIe link, and the two devices are a data transmit end and a data receive end of each other.

A typical PCIe system includes a root complex (Root Complex, RC), a PCIe switching device (that is, a PCIe switch), and a PCIe endpoint device. The RC may be located on a processor, and the RC occupies one bus number. The PCIe switch includes an upstream port and a downstream port. The upstream port is used to connect to a root port (root port, RP) of the RC or a downstream port of another PCIe switch. The root port of the RC, and the upstream port and the downstream port of the PCIe switch may alternatively be bridge devices. The bridge device is configured to connect to another bridge device or an endpoint device.

It should be noted that the PCIe switch may be a separate physical device, for example, a physical switch or a switching chip; or may be a hardware function module implemented in a chip, for example, a hardware function module integrated in a processor chip to implement a function of the PCIe switch.

Figure 1:
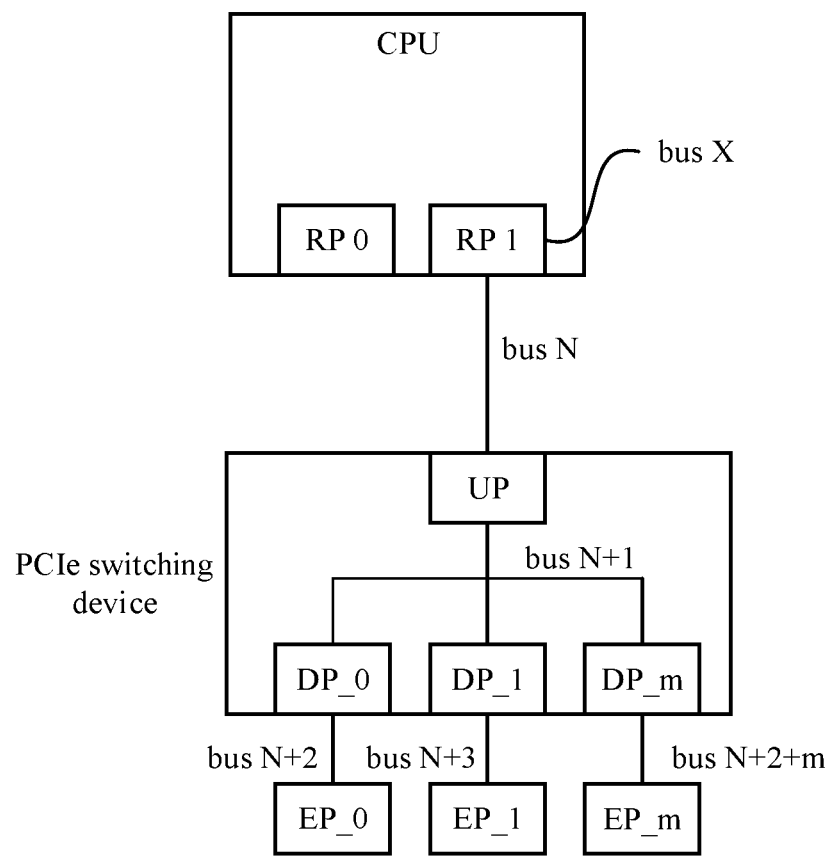
FIG. 1 is a schematic diagram of bus number allocation in a PCIe system.

For example, FIG. 1 is a schematic diagram of bus number allocation in a PCIe system. There are a plurality of root ports (Root Ports, RPs) on a processor (CPU). Two RPs are used as an example in the figure, and the plurality of RPs may be located on one or more RCs (not shown in the figure). For example, an RP 0 may be connected to an endpoint device or a bridge device (not shown in the figure). An RP 1 is connected to an upstream port (Upstream Port, UP) of the PCIe switch (switch). The PCIe switch includes m+1 downstream ports (Downstream Ports, DPs) marked as DP_0, DP_1, . . . , and DP_m. Each downstream port is connected to one endpoint device. Endpoint devices shown in FIG. 1 are marked as EP_0, EP_1, . . . , and EP_m. For example, the root port (RP) 1 connected to the upstream port (UP) occupies a bus X, and a link (link) between the RP 1 and the UP occupies a bus N. In this case, links from the upstream port inside the PCIe switch to the m+1 downstream ports occupy a bus N+1, and links between downstream ports and corresponding endpoint devices respectively occupy a bus N+2, a bus N+3, . . . , and a bus N+2+m. X is an integer greater than or equal to 0, and N is an integer greater than X. For example, when the two RPs shown in the figure are located in different RCs, and an RC at the left side of the RP 0 is first enumerated, a value of X depends on a bus number occupied by a PCIe structure under the left RC. For example, when the PCIe structure under the left RC occupies five bus numbers (that is, buses 0 to 4 are occupied by the left RC and the PCIe structure under the left RC), a value of X is 5, and a value of N is 6. When the two RPs shown in the figure are located in a same RC and the RC is an RC that is first enumerated by the processor, a value of X is 0. If a PCIe structure under a left RC occupies five bus numbers (that is, buses 0 to 4 are occupied by the RC and a PCIe structure under the RP 0), a value of N is 5.

PCIe devices may be classified into two types: one is a bridge device, for example, a root port (RP), an upstream port, and a downstream port, and the other is an endpoint device (Endpoint, EP). At both ends of the PCI bridge, two buses are connected respectively: a primary bus (Primary Bus) and a secondary bus (Secondary Bus). The PCIe bridge may manage a PCIe subtree under the PCIe bridge. The bridge device has a subordinate bus number register, a secondary bus number register, and a primary bus number register. The primary bus number register stores a PCIe bus number of an upstream of the bridge device, the secondary bus number register stores a PCIe bus number of a downstream of the bridge device, and the subordinate bus number register stores a PCIe bus number that is the largest number in the PCIe subtree of the downstream of the bridge device. A subordinate bus number is referred to as a subordinate bus number.

Figure 2:
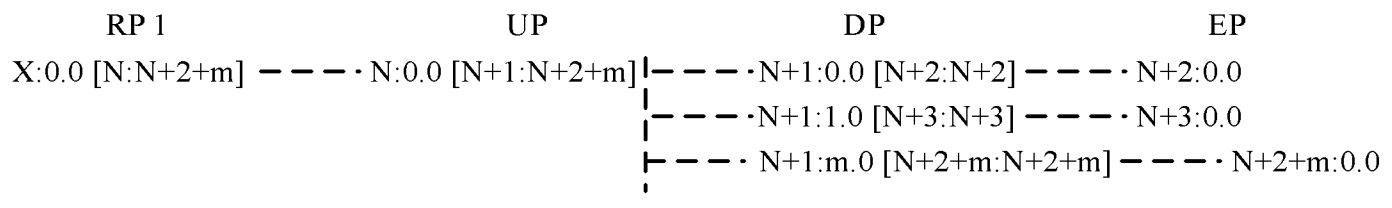

FIG. 2 is a schematic diagram of a PCIe device management topology corresponding to FIG. 1. For the RP 1, a primary bus number is X, BDF is X:0.0, a secondary bus number is N, and a subordinate bus number is N+2+m. For the upstream port (UP) of the PCIe switch connected to the RP 1, a primary bus number is N, BDF is N:0.0, a secondary bus number is N+1, and a subordinate bus number is N+2+m. For the downstream port DP_0 of the PCIe switch, a primary bus number is N+1, BDF is N+1:0.0, a secondary bus number is N+2, and a subordinate bus number is N+2. For the downstream port DP_1 of the PCIe switch, a primary bus number is N+1, BDF is N+1:1.0, a secondary bus number is N+3, and a subordinate bus number is N+3. For the downstream port DP_m of the PCIe switch, a primary bus number is N+1, BDF is N+1:m.0, a secondary bus number is N+2+m, and a subordinate bus number is N+2+m. BDF of the endpoint device EP_0 connected to the downstream port DP_0 is N+2:0.0, BDF of the endpoint device EP_1 connected to the downstream port DP_1 is N+3:0.0, and BDF of the endpoint device EP_m connected to the downstream port DP_m is N+2+m:0.0. The primary bus number, the secondary bus number, and the subordinate bus number may comply with definitions of a PCIe protocol. The primary bus number is used to represent a primary bus number, the secondary bus number is used to represent a secondary bus number, and the secondary bus number is used to represent a largest bus number in a PCIe subtree under a current-level bus. The secondary bus number and the subordinate bus number indicate a bus number range of the PCIe subtree under the current-level bus.

FIG. 1 and FIG. 2 are merely an example of possible bus allocation and a possible management topology in a PCIe system, and are used to indicate bus number allocation and a management topology. It may be learned that because PCIe is in a peer-to-peer connection, one PCIe endpoint device needs to occupy one bus number, so that a quantity of PCIe endpoint devices is limited by a quantity of bus numbers.

Figure 3:
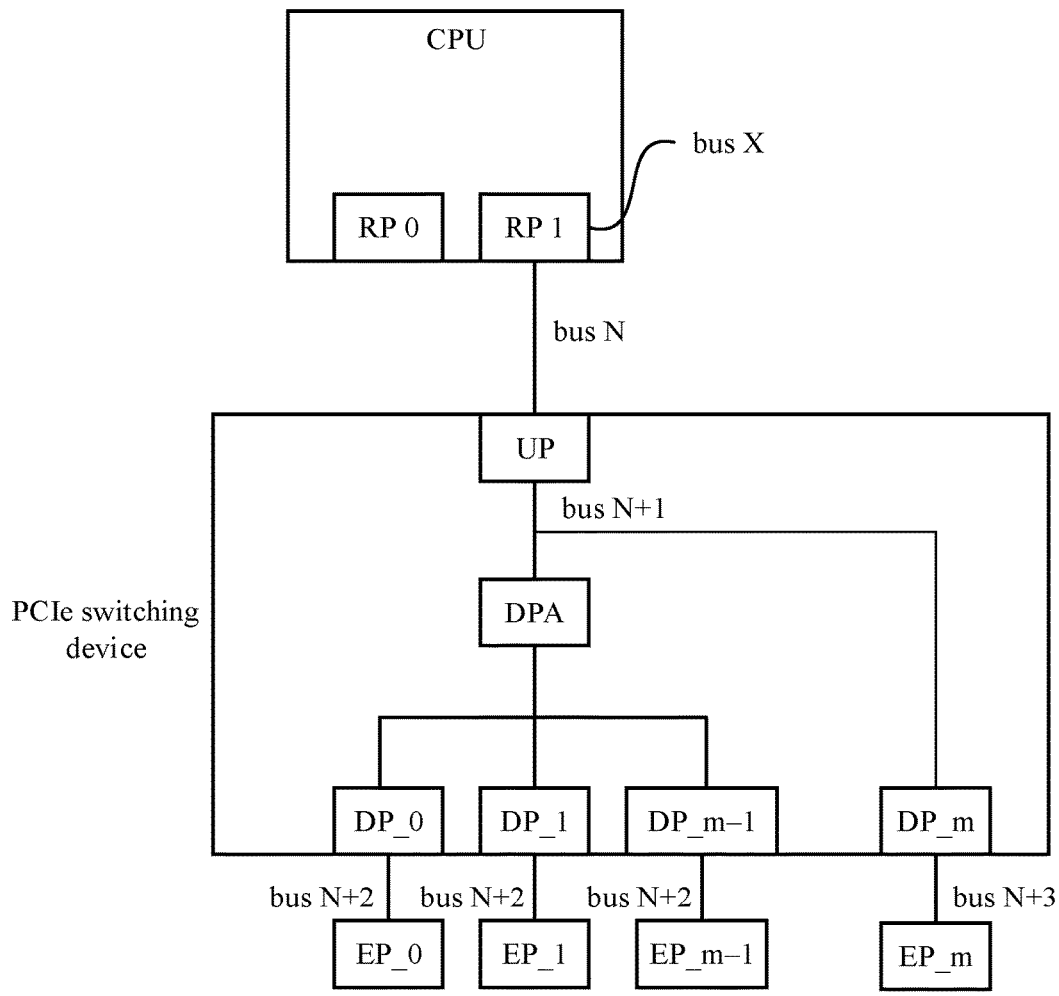
FIG. 3 is a schematic diagram of bus number allocation in a PCIe system according to an embodiment of this application.

FIG. 3 is a schematic diagram of bus number allocation in a PCIe system according to an embodiment of this application. The PCIe system shown in FIG. 3 includes a PCIe switch (that is, a PCIe switching device). In this embodiment of this application, a downstream port agent (Downlink Port Agent, DPA) is added to the PCIe switch. The DPA provides an agent service for a downstream port of the DPA, and endpoint devices connected to the downstream port of the DPA share a same bus. In this way, a quantity of buses is reduced and a quantity of endpoint devices that can be supported by the system is provided. In this embodiment of this application, the DPA is also referred to as a port agent apparatus. In a specific implementation scenario, the DPA may be an ASIC chip or a software module. When the DPA is a software module, a processor loads an instruction to implement a DPA function.

In a possible implementation, the PCIe switch may be a separate hardware device, for example, a switch or a switching chip; or may be a hardware function module integrated into another chip. The hardware function module includes an upstream port, a port agent apparatus, and a plurality of downstream ports. For example, the PCIe switch may be integrated into a processor chip of a host.

The schematic diagram of bus number allocation in the PCIe system shown in FIG. 3 implements bus number allocation logic different from that in FIG. 1 and FIG. 2. The PCIe system includes a processor (CPU), a PCIe switching device (for example, the PCIe switch shown in the figure), and a PCIe endpoint device. In subsequent embodiments of this application, a PCIe switch is used as an example to describe the solutions.

There are a plurality of root ports (two RPs are used as an example in the figure) on the processor, and the plurality of RPs may be located on one or more RCs (not shown in the figure). For example, an RP 0 may be connected to an endpoint device or a bridge device (not shown in the figure). An RP 1 is connected to an upstream port (UP) of the PCIe switch. The PCIe switch includes m+1 downstream ports marked as DP_0, DP_1, . . . , DP_m−1, and DP_m. Endpoint devices shown in FIG. 3 are marked as EP 0, EP 1, . . . , EP_m−1, and EP_m. Different from FIG. 1, in FIG. 3, a DPA is newly added to the PCIe switch. The upstream port (UP) is connected to the DPA, and the DPA is connected to some or all downstream ports of the PCIe switch. A downstream port connected to the DPA may be referred to as a downstream port of the DPA, a downstream port belonging to the DPA, or a downstream port for which an agent function is enabled. For example, in the figure, the downstream ports DP_0, DP_1, . . . , and DP_m−1 are used as downstream ports for which an agent function is enabled.

For example, the root port (RP) 1 connected to the upstream port (UP) occupies a bus X, and a link between the RP 1 and the UP occupies a bus N. In this case, a link from the upstream port (UP) to the DPA inside the PCIe switch occupies a bus N+1, m−1 links between the downstream ports DP_0, DP_1, . . . , and DP_m−1 and the endpoint devices EP_0, EP_1, . . . , and EP_m−1 share a bus N+2, and a link from the UP to the downstream port DP_m occupies a bus N+3. X is an integer greater than or equal to 0, and N is an integer greater than X. Examples of values of X and N are the same as those in FIG. 1. For example, when the two RPs shown in the figure are located in different RCs, and an RC at the left side of the RP 0 is first enumerated, a value of X depends on a bus number occupied by a PCIe structure under the left RC. For example, when the PCIe structure under the left RC occupies five bus numbers (that is, buses 0 to 4 are occupied by the left RC and the PCIe structure under the left RC), a value of X is 5, and a value of N is 6. When the two RPs shown in the figure are located in a same RC and the RC is an RC that is first enumerated by the processor, a value of X is 0. If a PCIe structure under a left RC occupies five bus numbers (that is, buses 0 to 4 are occupied), a value of N is 5.

Figure 4:
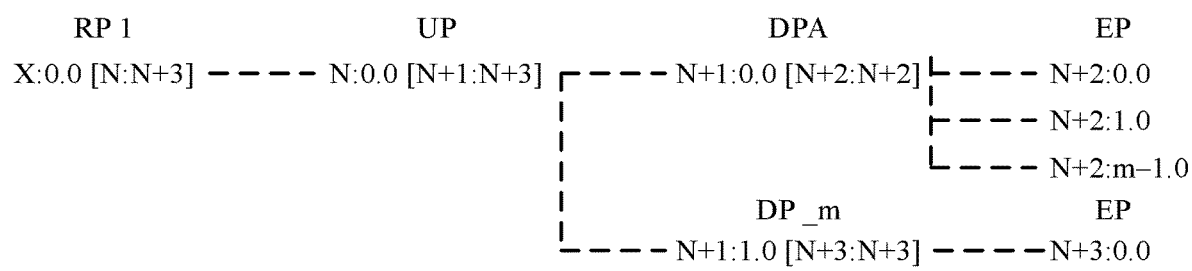
FIG. 4 is a schematic diagram of a PCIe device management topology corresponding to FIG. 3.

As shown in FIG. 4, an embodiment of this application further provides a schematic diagram of a PCIe device management topology corresponding to FIG. 3. For the RP 1, a primary bus number is X, BDF is X:0.0, a secondary bus number is N, and a subordinate bus number is N+3. For the upstream port (UP) of the PCIe switch connected to the RP 1, a primary bus number is N, BDF is N:0.0, a secondary bus number is N+1, and a subordinate bus number is N+3. For the DPA of the PCIe switch, a primary bus number is N+1, BDF is N+1:0.0, a secondary bus number is N+2, and a subordinate bus number is N+2. An agent function is enabled for the downstream ports DP_0, DP_1, . . . , and DP_m−1, and the DPA provides an agency for the m DPs. Therefore, primary bus numbers, secondary bus numbers, and subordinate bus numbers of the m DPs of the downstream ports DP_0, DP_1, . . . , and DP_m−1 are the same as those of the DPA. BDF of the endpoint device EP_0 is N+2:0.0, BDF of the endpoint device EP_1 is N+2:1.0, . . . , and BDF of the endpoint device EP_m−1 is N+2:m−1.0. An agent function is not enabled for the downstream port DP_m. For the downstream port DP_m, BDF is N+1:1.0, a primary bus number is N+1, a secondary bus number is N+3, and a subordinate bus number is N+3.

FIG. 3 and FIG. 4 show the bus allocation and the management topology after the DPA function is enabled in the PCIe switch according to an embodiment of this application. Specifically, the DPA may act as an agent for functions of the plurality of downstream ports of the PCIe switch, and present the plurality of downstream ports of the agent as one downstream port to the system. For example, one DPA may act as an agent for 32 downstream ports of a PCIe switch.

When routing a transaction layer protocol (Transaction Layer Protocol, TLP) packet, the DPA replaces, with a number of a downstream port connected to a corresponding endpoint device, a device identity (5-bit device ID) in BDF carried in the TLP packet, and then routes the TLP packet to the processor. Specifically, when a data packet sent by the PCIe endpoint device is a request TLP packet, the port agent apparatus is specifically configured to replace, with a number of a first downstream port connected to the PCIe endpoint device, a device identity in requester (Requester) BDF carried in the request TLP packet. Alternatively, when a data packet sent by the PCIe endpoint device is a completion TLP packet, the port agent apparatus is specifically configured to replace, with a number of a first downstream port connected to the PCIe endpoint device, a device identity in completer (Completer) BDF carried in the completion TLP packet. After the foregoing replacement operation, the DPA maps, to a secondary bus of the DPA, the PCIe endpoint device connected to the downstream port of the DPA. In this case, a plurality of PCIe endpoint devices connected to all downstream ports of the DPA share a same bus number, so that a problem that a subordinate bus needs to be allocated to an endpoint device connected to each downstream port of a PCIe switch in the conventional technology is resolved, and a limitation that a quantity of endpoint devices in a PCIe system needs be less than 256 (in an actual product implementation, because the RC and another bridge device still occupy bus numbers, a total quantity of PCIe endpoints may be less than 248) is avoided. According to this embodiment of this application, a waste caused when PCIe devices connected to downstream ports of a PCIe switch do not use up all 256 PCIe IDs represented by device(5bits).function(3bits) in the conventional technology is further avoided.

For example, in the conventional technology, m+2 bus numbers need to be occupied when a PCIe switch is connected to m PCIe endpoint devices. However, in this embodiment of this application, when an agent function is enabled for all m downstream ports of a PCIe switch, only three buses are occupied when the PCIe switch is connected to m PCIe endpoint devices. In this way, a quantity of port devices supported by the PCIe system is increased and bus utilization is improved.

In this embodiment of this application, the DPA is added to the PCIe switch, and an existing BIOS, OS, PCIe subsystem, and PCIe device driver do not need to be changed.

According to the foregoing solution disclosed in this embodiment of this application, a quantity of endpoint devices that can be connected to one PCIe switch can be greatly increased. An example of this embodiment of this application is as follows: A manner in which a computer system supports expansion of 7648 PCIe endpoint devices (for example, a solid state drive) having only function 0 is as follows:

Eight root ports occupy one bus. Each root port is cascaded with a PCIe switch. Each PCIe switch has 32 DPAs. Each PCIe switch connects to 32*32 PCIe endpoints having only function 0. In the calculation formula: n/32+34*n=256, n indicates a number of PCIe switches, each PCIe switch has 32 DPAs, each DPA can act as an agent for 32 downstream ports, and 34 buses are needed. n=7.52 is obtained through calculation, and n=7 is obtained through rounding. In this case, a maximum quantity of devices that can be cascaded with the PCIe switch is 7*32*32=7168. A total quantity of buses that are used is 1+7*34=239. A remaining 17 buses can be expanded to connect to devices whose quantity is (17−2)*32=480. Therefore, a maximum quantity of devices is 7168+480.

Figure 5:
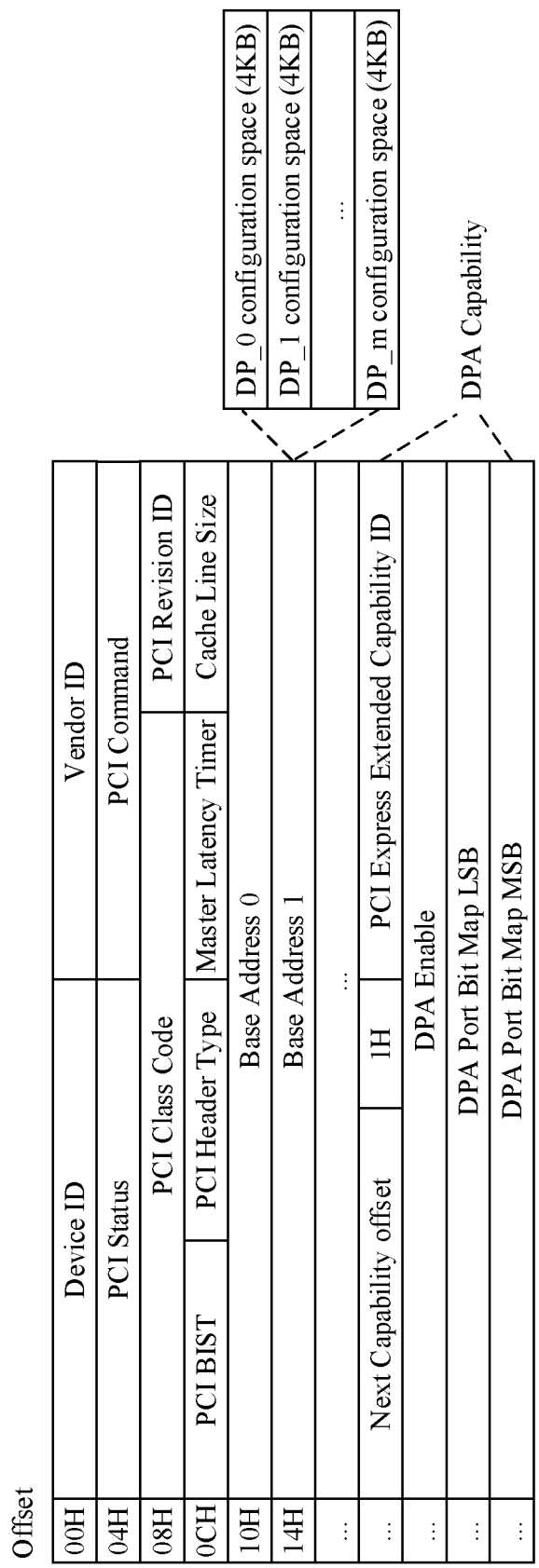
FIG. 5 is a schematic diagram of DPA configuration space according to an embodiment of this application.

As shown in FIG. 5, for example, an embodiment of this application provides a schematic diagram of DPA configuration space in a PCIe switch. A difference from DP configuration space defined in a PCIe protocol lies in the following:

A configuration space register BAR1 of a DPA maps configuration space of configuration space registers of all DPs belonging to the DPA. A DPA driver may indirectly access configuration space of all DPs under the DPA by using the BAR1 register, and process a PCIe switch DP link, an error, hot swapping, and the like.

A DPA function structure is newly added to DPA configuration space, and the DPA function structure includes an enable (enable) register and a bitmap register. The DPA enable register bit0 is configured to enable/disable the DPA function. For example, when a value is 1, it indicates that the DPA function is enabled. The bitmap register DPA Port Bit Map LSB/MSB register implements a 32-bit bitmap (which can be expanded when a quantity of PCIe switch DPs exceeds 32), and is adapted to configure each DP for which the DPA needs to act as an agent. Each bit of the bitmap indicates whether an agent function is enabled for a DP having a corresponding number. LSB whose full name is least significant bit refers to a least significant bit in a binary number, and MSB whose full name is most significant bit refers to a most significant bit in the binary number. The MSB is located on the leftmost side of the binary number, and the LSB is located on the rightmost side of the binary number.

For example, with reference to FIG. 3, in the downstream ports DP_0, DP_1, . . . , and DP_m, the agent function is enabled for the downstream ports DP_0, DP_1, . . . , and DP_m−1, and the agent function is not enabled for the downstream port DP_m. In this case, the DPA bitmap register is greater than or equal to m+1 bits. Values of bits used to represent the downstream ports DP_0, DP_1, . . . , and DP_m−1 in a bitmap may be 1, and a value of a bit used to represent the downstream port DP_m in the bitmap is 0. The bit with the value of 1 indicates that an agent function is enabled for a downstream port corresponding to the bit. The bit with the value of 0 indicates that an agent function is not enabled for a downstream port corresponding to the bit.

The PCIe switch including the DPA provided in this embodiment of this application is applicable to various PCIe architectures. For example, a plurality of PCIe switches including DPAs may constitute a multi-layer architecture. A PCIe switch including a DPA may also be used together with a conventional PCIe switch in a PCIe system. A plurality of DPAs may also be implemented in one PCIe switch. In this way, when a quantity of downstream ports that can be connected to a single DPA is limited, a plurality of DPAs are used in the PCIe switch to increase a quantity of endpoint devices that can be supported by the PCIe system.

Figure 6:
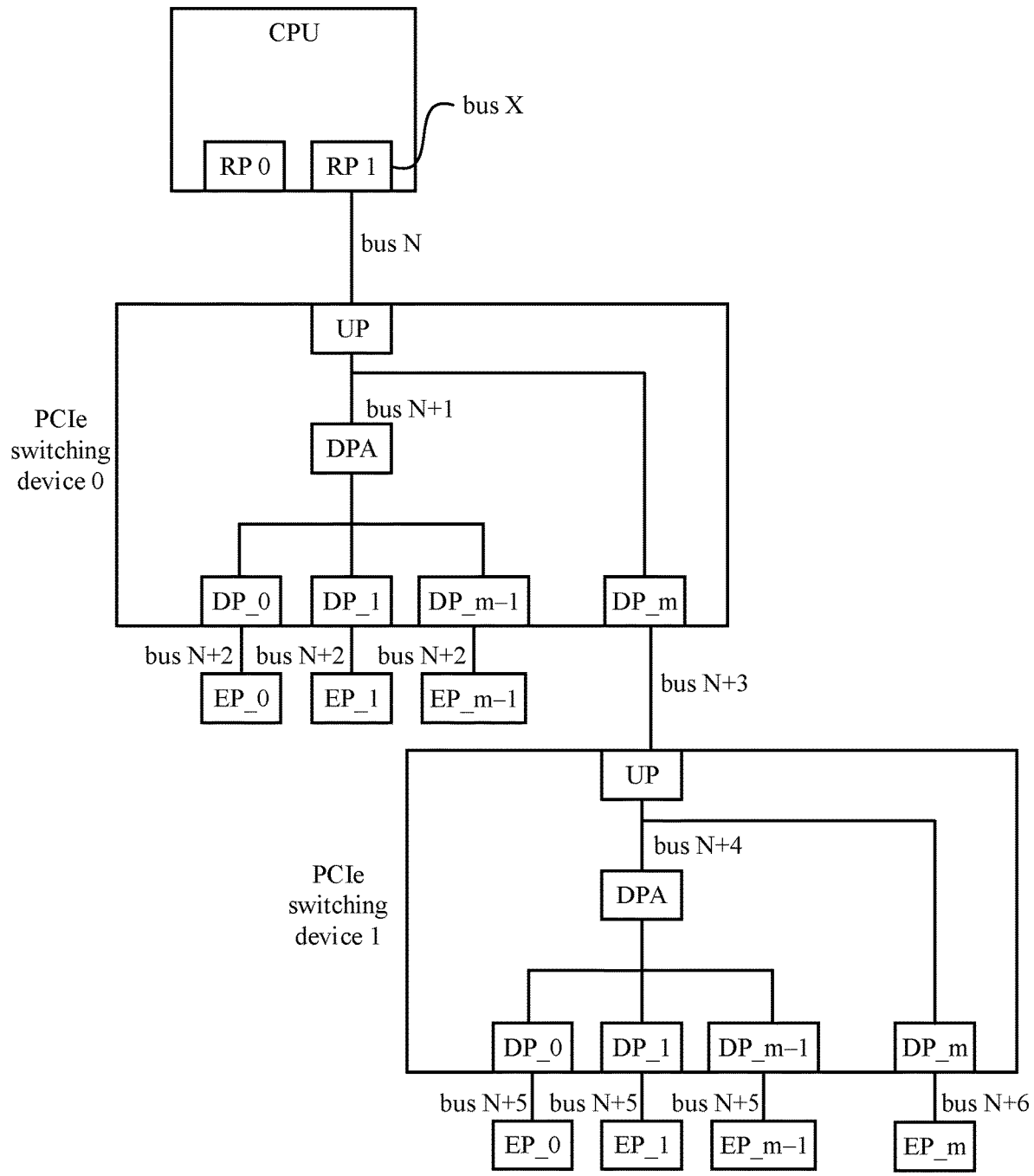
FIG. 6 is a schematic diagram of bus number allocation in another PCIe system according to an embodiment of this application.

For example, FIG. 6 is a schematic diagram of a structure of another PCIe system according to an embodiment of this application. In the PCIe system shown in the figure, two PCIe switches each including a DPA are in a serial connection, and a UP of a PCIe switch 1 is connected to a downstream port DP_m of a PCIe switch 0. In this case, for bus number allocation, refer to FIG. 6.

It should be noted that, in FIG. 3 and FIG. 6, all downstream ports under a DPA share a same secondary bus number. In another possible implementation, some (not all) downstream ports under a DPA share a same secondary bus number. In this case, a secondary bus number of the port agent apparatus is less than a subordinate bus number. A value obtained by subtracting the secondary bus number from the subordinate bus number is less than a quantity of the foregoing first downstream ports.

Figure 7:
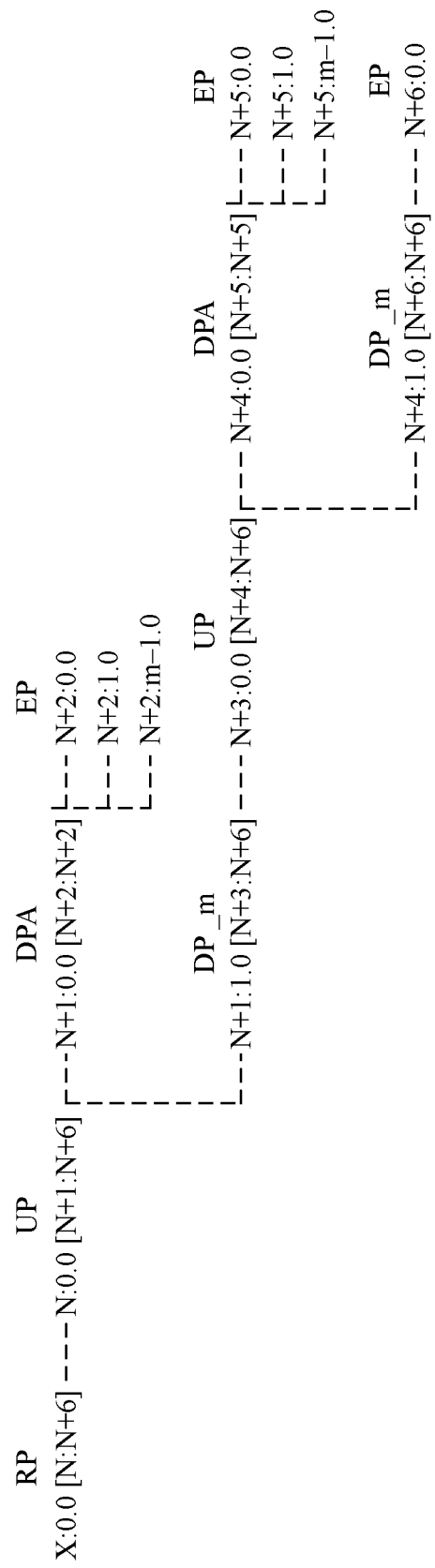
FIG. 7 is a schematic diagram of a PCIe device management topology corresponding to FIG. 6.

As shown in FIG. 7, an embodiment of this application provides a schematic diagram of a PCIe device management topology corresponding to FIG. 6. For an RP 1, a primary bus number is X, BDF is X:0.0, a secondary bus number is N, and a subordinate bus number is N+6. For an upstream port (UP) of the PCIe switch 0 connected to the RP 1, a primary bus number is N, BDF is N:0.0, a secondary bus number is N+1, and a subordinate bus number is N+6. For the DPA of the PCIe switch 0, a primary bus number is N+1, BDF is N+1:0.0, a secondary bus number is N+2, and a subordinate bus number is N+2. An agent function is enabled for downstream ports DP_0, DP_1, . . . , and DP_m−1, and the DPA provides an agency for the m DPs. Therefore, primary bus numbers, secondary bus numbers, and subordinate bus numbers of the m DPs of the downstream ports DP_0, DP_1, . . . , and DP_m−1 are the same as those of the DPA. BDF of endpoint devices connected to the downstream ports DP_0, DP_1, . . . , and DP_m−1 of the PCIe switch 0 is N+2:0.0, N+2:1.0, . . . , and N+2:m−1.0, respectively. An agent function is not enabled for the downstream port DP_m of the PCIe switch 0. For the downstream port DP_m, BDF is N+1:1.0, a primary bus number is N+1, a secondary bus number is N+3, and a subordinate bus number is N+6. A UP of the PCIe switch 1 is connected to the downstream port DP_m of the PCIe switch 0. For the UP of the PCIe switch 1, a primary bus number is N+3, BDF is N+3:0.0, a secondary bus number is N+4, and a subordinate bus number is N+6. For the DPA of the PCIe switch 1, a primary bus number is N+4, BDF is N+4:0.0, a secondary bus number is N+5, and a subordinate bus number is N+5. An agent function is enabled for downstream ports DP_0, DP_1, . . . , and DP_m−1 of the PCIe switch 1, and the DPA provides an agency for the m DPs. Therefore, primary bus numbers, secondary bus numbers, and subordinate bus numbers of the m DPs of the downstream ports DP_0, DP_1, . . . , and DP_m−1 of the PCIe switch 1 are the same as those of the DPA of the PCIe switch 1. BDF of endpoint devices connected to the downstream ports DP_0, DP_1, . . . , and DP_m−1 of the PCIe switch 1 is N+5:0.0, N+5:1.0, . . . , and N+5:m−1.0, respectively. An agent function is not enabled for a downstream port DP_m of the PCIe switch 1. For the downstream port DP_m, BDF is N+4:1.0, a primary bus number is N+4, a secondary bus number is N+6, and a subordinate bus number is N+6. BDF of an endpoint device connected to the downstream port DP_m of the PCIe switch 1 is N+6:0.0.

Figure 8:
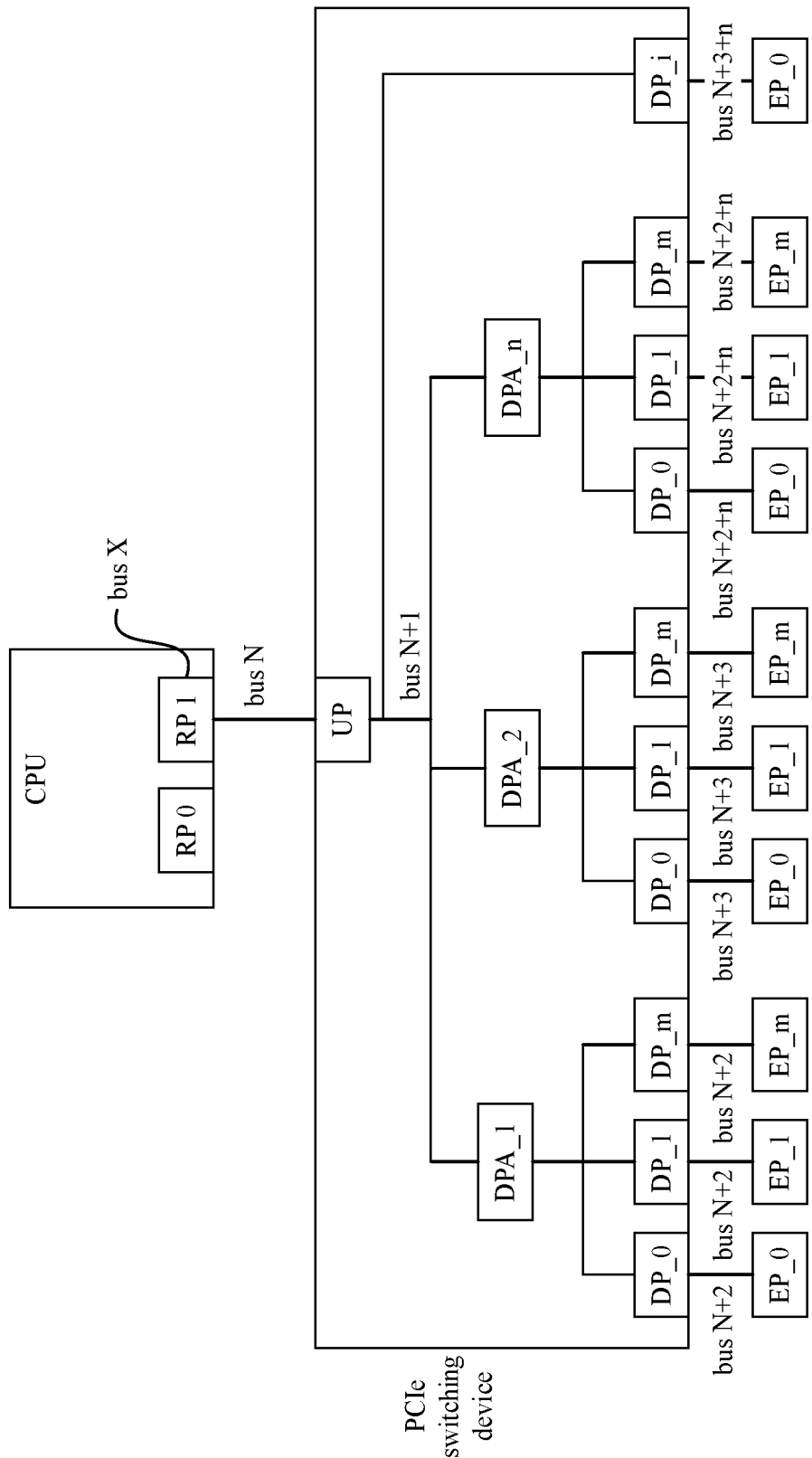
FIG. 8 is a schematic diagram of bus number allocation in still another PCIe system according to an embodiment of this application.

For example, FIG. 8 is a schematic diagram of a structure of still another PCIe system according to an embodiment of this application. In the PCIe system shown in the figure, a PCIe switch includes n parallel DPAs, each DPA has m downstream ports for which an agent function is enabled. An agent function is not enabled for a downstream port DP_i of the PCIe switch. In this case, for bus number allocation, refer to FIG. 8. Quantities of downstream ports of all DPAs may be different, and whether an agent function is enabled for a downstream port may be flexibly configured.

It should be noted that, in the foregoing embodiments, a downstream port for which an agent function is enabled may be referred to as a first downstream port, and a downstream port for which an agent function is not enabled may be referred to as a second downstream port.

The foregoing schematic diagram of the structure of the PCIe system is merely a possible implementation. It may be understood that the PCIe switch provided in this embodiment of this application may flexibly appear in various PCIe system structures, and a newly added DPA is used to provide an agent function for a downstream port of the PCIe switch.

With reference to the foregoing embodiments, an embodiment of this application further provides a working procedure of the DPA in the PCIe system. The working procedure includes at least one of the following: power-on or reset initialization of a PCIe switch; enumeration of PCIe devices; allocation of a PCIe memory address resource; routing of a TLP packet ID; routing of a TLP packet address; implicit routing of a TLP packet; hot swapping of an endpoint device; error detection and processing, and the like.

The power-on or reset initialization of the PCIe switch includes:

When the PCIe switch is powered on or reset for initialization, the PCIe switch completes settings of a DPA enable register bit0 and a DPA bitmap register Port Bit Map LSB/MSB register in a DPA function structure by using firmware (firmware), an electrically erasable programmable read-only memory (Electrically Erasable Programmable read-only memory, EEPROM), or the like. For example, the DPA enable register bit0 is set to 1, and in a bitmap from bit 0 to bit m−1 (for example, m is less than 31) that corresponds to any one of the two registers of the DPA Port Bit Map LSB register and the DPA Port Bit Map MSB register, a position corresponding to a port for which a DPA agency needs to be enabled is 1, so as to enable the DPA function and configure a downstream port (DP) that needs the DPA agency.

Figure 9A:
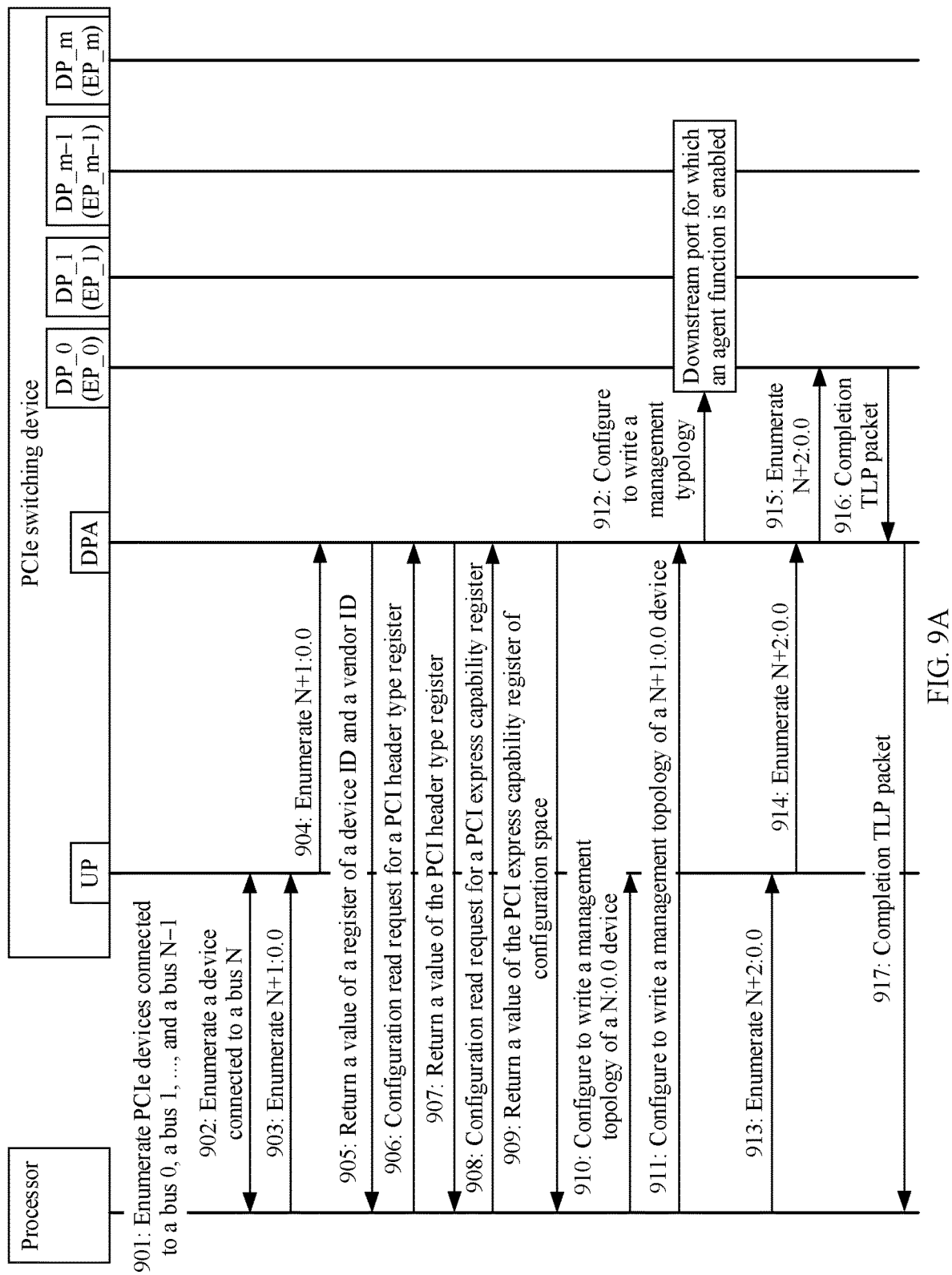
FIG. 9A and FIG. 9B are schematic flowcharts of enumerating PCIe devices according to an embodiment of this application.
Figure 9B:
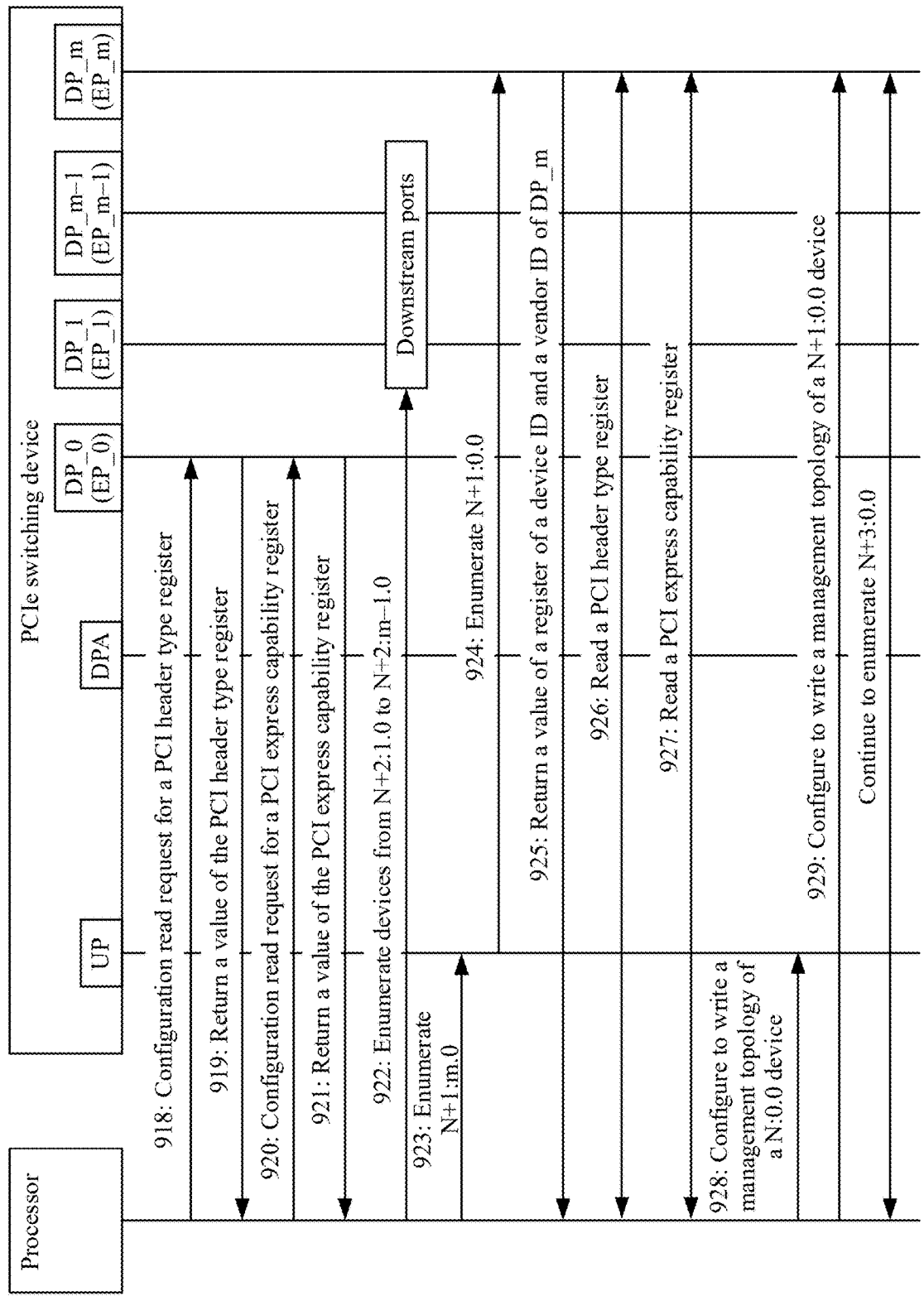

As shown in FIG. 9A and FIG. 9B, with reference to the PCIe system structure shown in FIG. 3, an embodiment of this application provides a schematic flowchart of enumerating PCIe devices, including:

Step 901: The processor enumerates, in sequence, PCIe devices connected to a bus 0, a bus 1, . . . , and a bus N−1.

For example, in this embodiment of this application, it is assumed that all devices connected to the bus 0, the bus 1, . . . , and the bus N−1 are conventional PCIe devices. In this case, an enumeration process complies with a definition of a PCIe protocol. Specifically, the processor may run system enumeration software (BIOS and/or OS) to perform the enumeration process. Enumeration triggering is not limited in this embodiment of this application. In a possible implementation, a definition in the PCIe protocol may be complied with.

Step 902: The processor enumerates a device connected to the bus N, and writes N to a primary bus number register of the upstream port of the PCIe switch, N+1 to a secondary bus number register of the upstream port of the PCIe switch, and N+1 to a subordinate bus number register of the upstream port of the PCIe switch.

For example, step 902 includes the following process:

The processor sends a configuration read request to the upstream port (UP) of the PCIe switch. The configuration read request is used to enumerate a device whose bus is N, device is 0, and function is 0, and obtain a device ID and a vendor ID of the device. The device ID and the vendor ID that are recorded in configuration space of the PCIe device are used to record a device identity and a vendor identity of the PCIe device. The device identity in the configuration space is written by a vendor, and is different from a device identity in BDF.

The upstream port (UP) of the PCIe switch detects that a primary bus number of the upstream port is 0, a secondary bus number of the upstream port is 0, and a subordinate bus number of the upstream port is 0, and returns, to the processor, a value of a register of the device ID and the vendor ID that is recorded in configuration space of the upstream port. It should be noted that, before the enumeration operation, initial values of a primary bus number, a secondary bus number, and a subordinate bus number of each port are all 0.

When determining that a value of the received device ID and vendor ID that is returned by the upstream port of the PCIe switch is not 0xFFFF, the processor determines that a PCIe device exists on the bus N. The processor sends a configuration read request for a PCI header type register of the device whose bus is N, device is 0, and function is 0. It should be noted that a value of the device ID and the vendor ID means a value obtained by combining the device ID and the vendor ID.

The upstream port (UP) of the PCIe switch receives the configuration read request for the PCI header type register that is sent by the processor, detects that the primary bus number of the upstream port is 0, the secondary bus number of the upstream port is 0, and the subordinate bus number of the upstream port is 0, and returns a value of the PCI header type register of the configuration space of the upstream port of the PCIe switch to the processor.

According to a definition of the PCIe protocol, a value of a PCI header type register of a PCI-PCI bridge is 1000000 1b. The processor identifies, according to the PCIe protocol, that the device whose bus is N, device is 0, and function is 0 is a PCI-PCI bridge.

The processor sends a configuration read request for a PCI express capability register of configuration space of the device whose bus is N, device is 0, and function is 0.

The upstream port of the PCIe switch receives the configuration read request for the PCI express capability register, detects that the primary bus number of the upstream port is 0, the secondary bus number of the upstream port is 0, and the subordinate bus number of the upstream port is 0, and returns a value of the PCI express capability register of the configuration space of the upstream port of the PCIe switch to the processor.

When the processor reads that the value of the PCI express capability register that is returned by the upstream port of the PCIe switch is not 0xFFFF, and a device/port type field is 0101b, the processor identifies, according to the PCIe protocol, that the device whose bus is N, device is 0, and function is 0 is the upstream port of the PCIe switch.

The processor sends a configuration write request to the device whose bus is N, device is 0, and function is 0, to write N to the primary bus number register of the upstream port of the PCIe switch, N+1 to the secondary bus number register of the upstream port of the PCIe switch, and N+1 to the subordinate bus number register of the upstream port of the PCIe switch.

After completing enumeration of the device connected to the bus N, the processor continues to enumerate a device connected to the bus N+1. In this embodiment of this application, the processor enumerates a DPA in the PCIe switch.

Step 903: The processor sends a configuration read request to the upstream port (UP) of the PCIe switch. The configuration read request is used to enumerate a device whose bus is N+1, device is 0, and function is 0, and obtain a device ID and a vendor ID of the device.

Step 904: Because the bus carried in the configuration read request is N+1 in step 903, after determining that a secondary bus number of the upstream port is N+1 and a subordinate bus number of the upstream port is N+1, the upstream port of the PCIe switch transfers the configuration read request to an internal route and sends the configuration read request to the DPA.

Step 905: The DPA detects that a primary bus number of a DPA port is 0, a secondary bus number of the DPA port is 0, and a subordinate bus number of the DPA port is 0, and the DPA further determines, based on the configuration space enable register bit0, that the DPA of the PCIe switch is enabled, and determines, based on a port enabling record, that a downstream port for which an agent function is enabled exists. The DPA returns, to the processor, a value of a register of a device ID and a vendor ID that are recorded in configuration space the port.

It should be noted that the vendor ID recorded in the configuration space of the PCIe device is an ID of the vendor, the device ID is an ID of the PCIe device provided by the vendor, and the device ID and the vendor ID are used to indicate validity of the PCIe device. A difference lies in that the device ID in the BDF is allocated when the processor enumerates a PCIe device, and is used to manage the PCIe device. Therefore, the device ID in the BDF is different from the device ID recorded in the configuration space of the PCIe device.

The port enabling record may be recorded in a bitmap register, and a bitmap value that corresponds to each downstream port of the PCIe switching device and that is recorded in the bitmap register is used to indicate whether an agent function is enabled for an endpoint device connected to each downstream port. The port enabling record may also be a mapping table. The bitmap register may be a DPA Port Bit Map LSB/MSB register.

Step 906: The processor receives the device ID and the vendor ID that are returned by the DPA, and when determining that a value of the device ID and the vendor ID is not 0xFFFF, determines that a PCIe device exists on the bus N+1. The processor sends a configuration read request for a PCI header type register of the device whose bus is N+1, device is 0, and function is 0.

Step 907: The DPA receives the configuration read request for the PCI header type register that is sent by the processor, detects that the primary bus number of the upstream port is 0, the secondary bus number of the upstream port is 0, and the subordinate bus number of the upstream port is 0, and returns a value of the PCI header type register of the configuration space of the DPA port to the processor.

According to the definition of the PCIe protocol, the value of the PCI header type register of the PCI-PCI bridge is 10000001b. The processor identifies, according to the PCIe protocol, that the device whose bus is N+1, device is 0, and function is 0 is a PCI-PCI bridge.

Step 908: The processor sends a configuration read request for a PCI express capability register of configuration space of the device whose bus is N+1, device is 0, and function is 0.

Step 909: The DPA receives the configuration read request for the PCI express capability register, detects that the primary bus number of the upstream port is 0, the secondary bus number of the upstream port is 0, and the subordinate bus number of the upstream port is 0, and returns a value of the PCI express capability register of the configuration space of the DPA port to the processor.

When the processor reads that the value of the PCI express capability register that is returned by the DPA is not 0xFFFF, and a device/port type field is 0110b, the processor identifies, according to the PCIe protocol, that the device whose bus is N+1, device is 0, and function is 0 is a downstream port of the PCIe switch. In other words, the processor identifies the DPA as a downstream port of the PCIe switch.

Step 910: The processor sends a configuration write request to the device whose bus is N, device is 0, and function is 0, to write N to a primary bus number register of a PCIe upstream port, N+1 to a secondary bus number register of the PCIe upstream port, and N+2 to a subordinate bus number register of the PCIe upstream port.

Step 911: The processor sends a configuration write request to the device whose bus is N+1, device is 0, and function is 0, to write N+1 to a primary bus number register of the DPA, N+2 to a secondary bus number register of the DPA, and N+2 to a subordinate bus number register of the DPA.

Step 912: The DPA receives the configuration write request sent by the processor to the device whose bus is N+1, device is 0, and function is 0, to write N+1 to a primary bus number register, N+2 to a secondary bus number register, and N+2 to a subordinate bus number register. Further, for a downstream port for which a DPA agent function is enabled, the DPA writes, based on a value of the bitmap register, N+1 to a primary bus number register, N+2 to a secondary bus number register, and N+2 to a subordinate bus number register. For example, correspondingly, in FIG. 3, for the downstream ports DP_0, DP_1, . . . , and DP_m−1, N+1 is written to primary bus number registers, N+2 is written to secondary bus number registers, and N+2 is written to subordinate bus number registers.

The processor continues to enumerate a device connected to the bus N+2. To be specific, the processor enumerates endpoint devices connected to the downstream ports 0, 1, . . . , and m−1 under the DPA.

Step 913: The processor sends a configuration read request. The configuration read request is used to enumerate a device whose bus is N+2, device is 0, and function is 0, and obtain a device ID and a vendor ID of the device.

Step 914: Because the bus carried in the configuration read request is N+1 in step 913, after determining that a secondary bus number of the upstream port is N+1 and a subordinate bus number of the upstream port is N+2, the upstream port of the PCIe switch transfers the configuration read request to an internal route and sends the configuration read request to the DPA.

Step 915: The DPA detects that a primary bus number of the DPA port is N+1, a secondary bus number of the DPA port is N+2, and a subordinate bus number of the DPA port is N+2, and the DPA further determines, based on the configuration space enable register bit0, that the DPA of the PCIe switch is enabled, and determines, based on a value of any one of the two bitmap registers of the DPA Port Bit Map LSB register and the DPA Port Bit Map MSB register, that a downstream port for which an agent function is enabled exists. The DPA routes the configuration read request to the downstream port DP_0.

The downstream port DP_0 detects that a primary bus number of the downstream port DP_0 is N+1, a secondary bus number of the downstream port DP_0 is N+2, and a subordinate bus number of the downstream port DP_0 is N+2, and routes the configuration read request to the endpoint device EP_0 connected to the downstream port DP_0.

Step 916: The endpoint device EP_0 returns a completion TLP (Completion TLP) packet to the downstream port DP_0, and the completion TLP packet carries a value of a register of a device ID and a vendor ID of the endpoint device EP_0. The downstream port DP_0 routes the completion TLP packet to the DPA.

Step 917: The DPA receives the completion TLP packet, and the DPA determines, based on the enable register bit0, that a DPA function is enabled, determines, based on the bitmap register, that an agent function is enabled for the downstream port DP_0, converts a device identity in the completion TLP packet into 0, and then routes the completion TLP packet to the processor by using the upstream port of the PCIe switch. The device identity in the completion TLP packet is carried in completer BDF, and the completer BDF is also referred to as a completer ID.

Step 918: The processor receives the completion TLP packet, and when determining that a value of a device ID and a vendor ID in the completion TLP packet is not 0xFFFF, determines that a PCIe device exists on the bus N+2. The processor sends a configuration read request for a PCI header type register of the device whose bus is N+2, device is 0, and function is 0.

Step 919: Similar to the foregoing solution, the PCIe endpoint device EP_0 returns a value of the PCI header type register of this device. The processor reads that the value of the PCI header type register that is returned by the PCIe endpoint device EP_0 is 00000000b. The system enumeration software identifies, according to the PCIe protocol, that the device whose bus is N+2, device is 0, and function is 0 is an endpoint device and includes only one function.

Step 920: Similarly, the processor continues to read a PCI express capability register of configuration space of the device whose bus is N+2, device is 0, and function is 0.

Step 921: The PCIe endpoint device EP_0 returns a value of the PCI express capability register. The system enumeration software reads that the value of the PCI express capability register that is returned by the PCIe endpoint device EP_0 is not 0xFFFF, and a device/port type field is 0000b. The system enumeration software identifies, according to the PCIe protocol, that the device whose bus is N+2, device is 0, and function is 0 is an endpoint device.

If the endpoint device has a plurality of functions, the system enumeration software reads that the value of the PCI header type register that is returned by the PCIe endpoint device EP_0 is 10000000b. The system enumeration software identifies, according to the PCIe protocol, that the device whose bus is N+2, device is 0, and function is 0 is an endpoint device and includes a plurality of functions. The system enumeration software repeats the foregoing steps to enumerate the endpoint device whose bus is N+2, device is 0, and functions are 1-7 into the system.

After the processor (system enumeration software) enumerates the downstream port DP_0, all device functions under the bus N+2 need to be scanned. In a specific implementation, a start parameter for forcible scanning is added to a kernel of a computer operating system. For example, for a Linux system, a start parameter pci=pcie_scan_all may be added to a Linux kernel, so that a processor can forcibly enumerate all device functions under the bus N+2, that is, 256 scans are performed in total. When the value of the PCI header type register that is returned by the endpoint port EP_0 and that is received by the processor is 00000000b, a case is avoided in which the processor mistakenly determines that bus scanning of the bus N+2 is completed and omits scanning of another device function on the bus N+2 because the endpoint port EP_0 is found to be a device having only one function. For example, another parameter setting manner may be further used, so that the processor can perform complete scanning on a device connected to a secondary bus of the DPA. Details are not described in this embodiment of this application.

Based on the foregoing settings, after the processor completes enumeration of a device whose bus is N+2 and device is 0, in step 922, the processor continues to enumerate a device function whose bus is N+2, device is 1 to m−1, and function is 1 to 7, where m is an integer greater than or equal to 1. A specific enumeration process is the same as a process in which the processor enumerates the device whose bus is N+2, device is 0, and function is 0. Details are not described in this embodiment of this application.

It should be noted that, when a downstream port for which the agent function is enabled is not connected to a PCIe endpoint device, the processor skips the port in the enumeration process, skips a device ID corresponding to the port, and continues to enumerate another downstream port.

After the processor completes enumeration of all endpoint devices under the bus N+2, the processor continues enumeration and traverses the bus N+1.

Step 923: The processor sends a configuration read request for a device whose bus is N+1, device is m, and function is 0. The configuration read request is used to obtain a device ID and a vendor ID of the device.

For example, in the PCIe architecture diagram shown in FIG. 3, after enumeration of endpoint devices connected to the downstream ports DP_0 to DP_m−1 under the DPA is completed, the processor continues to enumerate a device connected to the downstream port DP_m. In this case, a device ID carried in the configuration read request is 1 (that is, in a process of enumerating the downstream port DP_m in the application of the architecture in FIG. 3, a value of m in the following steps is 1). It should be noted that, when an agent function is not enabled for a plurality of downstream ports, the device ID of the configuration read request herein is increased by 1 one by one.

Step 924: Because the bus carried in the configuration read request is N+1 in step 923, after determining that a secondary bus number of the upstream port is N+1 and a subordinate bus number of the upstream port is N+2, the upstream port of the PCIe switch transfers the configuration read request to an internal route and sends the configuration read request to the downstream port DP_m.

Step 925: The downstream port DP_m of the PCIe switch detects that a primary bus number of the downstream port DP_m is 0, a secondary bus number of the downstream port DP_m is 0, and a subordinate bus number of the downstream port DP_m is 0, and returns a value of a register of a device ID and a vendor ID of the downstream port DP_m to the processor.

The processor determines that a value of the device ID and the vendor ID that is returned by the downstream port DP_m of the PCIe switch is not 0xFFFF, and determines that the device whose bus is N+1, device is m, and function is 0 exists.

Step 926: Similarly, the processor continues to read a PCI header type register of configuration space of the device whose bus is N+1, device is m, and function is 0. The processor learns that a value of the PCI header type register that is returned by the downstream port DP_m is 10000001b. The system enumeration software identifies, according to the PCIe protocol, that the device whose bus is N+1, device is m, and function is 0 is a PCI-PCI bridge.

Step 927: Similarly, the processor continues to read a PCI express capability register of configuration space of the device whose bus is N+1, device is m, and function is 0. The processor reads that the value of the PCI express capability register that is returned by the downstream port DP_m of the PCIe switch is not 0xFFFF, and a device/port type field is 0110b. The system enumeration software identifies, according to the PCIe protocol, that the device whose bus is N+1, device is m, and function is 0 is a downstream port of the PCIe switch.

Step 928: For the device whose bus is N, device is 0, and function is 0, the processor configures to write N to a primary bus number register, N+1 to a secondary bus number register, and N+3 to a subordinate bus number register. To be specific, N is in a primary bus number register of the upstream port of the PCIe switch, N+1 is in a secondary bus number register of the upstream port of the PCIe switch, and N+3 is in a subordinate bus number register of the upstream port of the PCIe switch.

Step 929: For the device whose bus is N+1, device is m, and function is 0, the processor configures to write N+1 to a primary bus number register, N+3 to a secondary bus number register, and N+3 to a subordinate bus number register. To be specific, N+1 is in a primary bus number register of the downstream port DP_m of the PCIe switch, N+3 is in a secondary bus number register of the downstream port DP_m of the PCIe switch, and N+3 is in a subordinate bus number register of the downstream port DP_m of the PCIe switch.

After steps 924 to 929, the processor completes enumeration of the downstream port DP_m. Further, the processor continues to enumerate the bus N+3 to perform enumeration of the endpoint device EP_m.

When another downstream port for which an agent function is not enabled exists, the processor continues, in a same manner, to enumerate the another downstream port and a PCIe device connected to the another downstream port.

In the foregoing manner, the processor completes enumeration of the PCIe system shown in FIG. 3. In another possible implementation, when the PCIe system has more lower-level PCIe switches and the PCIe switches have more ports, device enumeration in various PCIe systems can be completed by repeating the foregoing steps.

The allocation of the PCIe memory address resource includes:

A processor (running system enumeration software) allocates a memory address to each PCIe device in a PCIe system. In a possible implementation, the processor may allocate a memory address based on a conventional algorithm for PCIe device memory (memory) address resource allocation.

The processor first traverses a memory address resource needed for declaration of each PCIe endpoint device, then applies for corresponding address space from the system memory address resource, writes a start address to a BAR register of the PCIe endpoint device, and adjusts an address window of each bridge device on a path from the endpoint device to an RP, for example, 32-bit address windows represented by a memory limit register and a memory base register of the PCI-PCI bridge, and 64-bit address windows represented by a prefetchable memory limit register, a prefetchable memory base register, a prefetchable memory upper base address register, and a prefetchable memory upper limit address register.

Specifically, a DPA of a PCIe switch performs recording when routing a configuration write TLP packet of the system enumeration software for the memory base register of the PCIe endpoint device to a downstream port of the PCIe switch. The PCIe switch can sense 32-bit or 64-bit start addresses of all endpoint devices connected to the downstream ports. The address windows (32-bit and 64-bit address windows based on the PCI-PCI bridge) of the bridge device need to include an address range used by all downstream PCIe devices. Firmware (FW) of the PCIe switch can calculate an end address based on the start address of the PCIe endpoint device connected to each downstream port, and set the end address to a memory limit register, a memory base register, a prefetchable memory limit register, a prefetchable memory base register, a prefetchable memory upper base address register, and a prefetchable memory upper limit address register of the downstream port. For example, FIG. 10 is a diagram of memory address resource allocation according to an embodiment of this application. In a PCIe system architecture, an address window of an upstream device includes an address window of a downstream device at each layer of the upstream device. In the example in FIG. 10, the address windows are continuous. Specifically, an address window of an upstream port of a PCIe switch is [A, Z], an address window of a DPA of the PCIe switch is [A, Y], and an agent function is enabled for downstream ports DP_0, DP_1, . . . , and DP_m−1 of the PCIe switch. In this case, an address window of the downstream port DP_0 for which the DPA of the PCIe switch acts as an agent is [A, B], an address window of the downstream port DP_1 is [B, C], . . . , an address window of the downstream port DP_m−1 is [X, Y], and an address window of the downstream port DP_m for which an agent function is not enabled is [Y, Z]. In a possible implementation, when there is a register having a sufficient capacity to record discrete address windows, the address windows of the devices may also use discontinuous address space.

The PCIe protocol defines working procedures such as ID based routing (ID Based Routing), address based routing (Address Based Routing), and implicit routing (implicit routing). When the PCIe switch including the DPA according to this embodiment of this application is applied to a PCIe architecture, the foregoing working procedures also need to be correspondingly adjusted.

Figure 11:
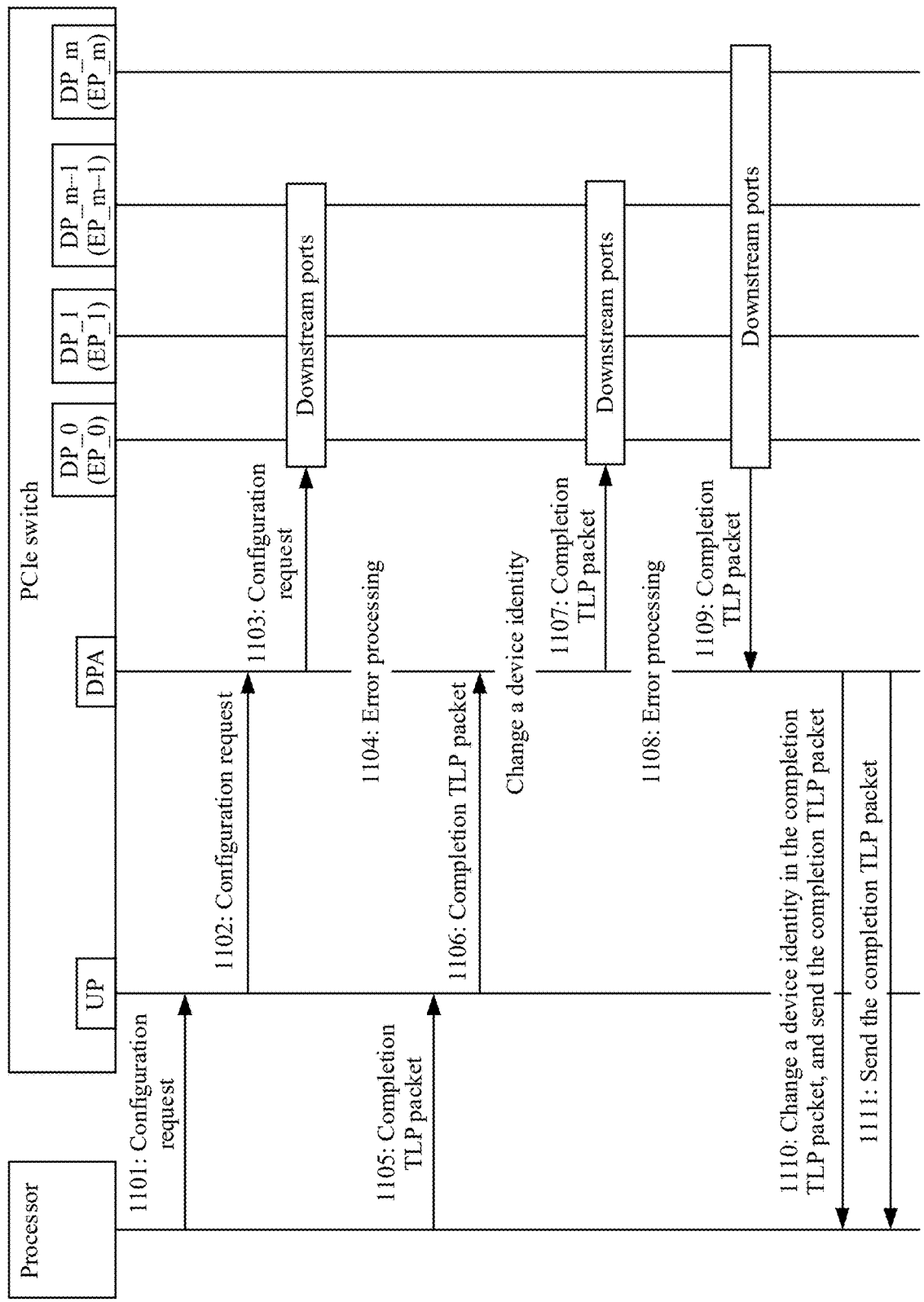
FIG. 11 is a schematic flowchart of an ID routing method according to an embodiment of this application.

FIG. 11 is a schematic flowchart of an ID routing method according to an embodiment of this application. ID routing is usually applied to a transfer process of a configuration request (a configuration read request/write request). The method includes:

Step 1101: An upstream port of a PCIe switch receives a configuration request from a processor, determines whether a bus number in BDF carried in the configuration request falls within a range of a secondary bus and a subordinate bus of the upstream port, and if the bus number in the BDF carried in the configuration request falls within the range of the secondary bus and the subordinate bus of the upstream port, transfers the configuration request to an internal route of the PCIe switch and sends the configuration request to a DPA.

The configuration request may be a configuration read/write request TLP packet sent by the processor. It should be noted that this embodiment of this application is described by using an example in which the configuration request is sent to the DPA. When the upstream port needs to route, based on the BDF carried in the configuration request, the configuration request to a downstream port for which an agent function is not enabled, a procedure specified in a PCIe protocol may be performed.

Step 1102: The DPA receives the configuration request, and determines whether a bus number in destination BDF carried in the configuration request falls within a range of a secondary bus and a subordinate bus of the DPA. If the bus number in the destination BDF carried in the configuration request falls within the range of the secondary bus and the subordinate bus of the DPA, the DPA routes the configuration request to a corresponding downstream port based on D (that is, a device identity, which may be represented by device(5bits)) in the destination BDF carried in the configuration request. A value of the device identity carried in the configuration request is used as a number of the downstream port. The DPA changes, to 0, the device identity in the destination BDF carried in the configuration request.

Step 1103: The downstream port routes the configuration request to an endpoint device connected to the downstream port.

For a specific example of processing the configuration request in steps 1101 to 1103, refer to steps 913 to 916.

Step 1104: If the bus number in the BDF carried in the DPA configuration request does not belong to the range defined by the secondary bus and the subordinate bus of the DPA, it indicates that a routing error occurs. In this case, the DPA may perform an operation based on an error processing procedure of a bridge device defined in the protocol. This is not limited in this embodiment of this application.

Step 1105: The upstream port of the PCIe switch receives a completion TLP packet sent by the processor, determines whether a bus number in requester BDF carried in the completion TLP packet falls within the range of the secondary bus and the subordinate bus of the upstream port, and if the bus number in the requester BDF carried in the completion TLP packet falls within the range of the secondary bus and the subordinate bus of the upstream port, transfers the completion TLP packet to an internal route of the PCIe switch and sends the completion TLP packet to the DPA.

Step 1106: The DPA receives the completion TLP packet, and determines whether a bus number in requester BDF carried in the completion TLP packet falls within the range of the secondary bus and the subordinate bus of the DPA. If the bus number in the requester BDF carried in the completion TLP packet falls within the range of the secondary bus and the subordinate bus of the DPA, the DPA changes, to 0, D (that is, the device identity, which may be represented by device(5bits)) in the requester BDF carried in the completion TLP packet, and then routes the completion TLP packet to a corresponding downstream port. A value of an original device identity in the requester BDF carried in the completion TLP packet is used as a number of the downstream port.

Step 1107: The downstream port routes the completion TLP packet to an endpoint device connected to the downstream port.

Step 1108: When the DPA determines that the bus number in the requester BDF carried in the completion TLP packet does not fall within the range of the secondary bus and the subordinate bus of the DPA, it indicates that a routing error occurs, and an error processing operation is performed.

Step 1109: The downstream port of the PCIe switch receives a completion TLP packet from the endpoint device, and sends the completion TLP packet to the DPA.

Step 1110: The DPA receives the completion TLP packet, determines a number of the downstream port that sends the completion TLP packet, determines, based on an enable register bit0, that a DPA function is enabled, and determines, based on a value of a bitmap register, that an agent function is enabled for a downstream port that sends the completion TLP packet. Then, the DPA changes, to the number of the downstream port, a device identity in completer BDF carried in the completion TLP packet, and routes the completion TLP packet to the processor by using the upstream port.

Step 1111: After the DPA receives the completion TLP packet, if the DPA determines, based on an enable register big), that a DPA function is not enabled, or determines, based on a value of a bitmap register, that an agent function is not enabled for a downstream port that sends the completion TLP packet, the DPA does not modify a device identity of the completion TLP packet, but directly sends the completion TLP packet to the processor by using the upstream port.

Logic of a method for a PCIe switch including a DPA to perform address routing includes:

When receiving a memory operation request (for example, a memory read/write request TLP packet) from a processor, an upstream port of the PCIe switch determines whether a target address falls within an address window of the upstream port of the PCIe switch. If the target address falls within the address window of the upstream port of the PCIe switch, an internal route of the PCIe switch is entered. Whether the target address falls within an address window of the DPA of the PCIe switch is determined based on the internal route of the PCIe switch. If the target address falls within a range of the address window of the DPA of the PCIe switch, the upstream port of the PCIe switch routes the received memory operation request to the DPA of the PCIe switch. The DPA determines whether the target address falls within an address window of a downstream port for which the DPA acts as an agent. If the target address falls within a range of the address window of the downstream port for which the DPA of the PCIe switch acts as the agent, the memory operation request is routed to the downstream port for which the DPA of the PCIe switch acts as the agent. The downstream port of the PCIe switch routes the memory operation request to a PCIe endpoint device connected to the downstream port. If the DPA determines that the target address falls within an address window of a downstream port for which the DPA of the PCIe switch does not act as an agent, it indicates that a routing error occurs.

When receiving a memory operation request (for example, a memory read/write request TLP packet) from an endpoint device, a PCIe downstream port sends the memory operation request to the DPA. The DPA detects whether an agent function is enabled for a downstream port that sends the memory operation request. If the agent function is not enabled for the downstream port that sends the memory operation request, the DPA routes the memory operation request to the processor by using the upstream port. If the agent function is enabled for the downstream port that sends the memory operation request, the DPA changes a device identity in the memory operation request to a number of the downstream port that sends the memory operation request, and then routes the memory operation request to the processor by using the upstream port. Specifically, the device identity in the memory operation request is carried in BDF in the request.

Logic of a method for a PCIe switch including a DPA to perform implicit routing includes:

When an upstream port of the PCIe switch receives an implicit TLP packet (that is, a message packet) from a processor, routing is performed based on a message routing subfield in the implicit TLP packet.

When receiving the implicit TLP packet sent by the upstream port, the DPA determines whether an agent function is enabled for a downstream port that sends the implicit TLP packet. If the agent function is enabled for the downstream port that sends the implicit TLP packet, a device identity in requester BDF in the implicit TLP packet is changed to 0. If the agent function is not enabled for the downstream port that sends the implicit TLP packet, routing is directly performed based on the message routing subfield in the TLP packet.

When the implicit TLP packet actively sent by the downstream port for which the DPA of the PCIe switch acts as an agent passes by the DPA of the PCIe switch, the DPA needs to change a requester ID or the requester BDF in the TLP packet to BDF of the DPA of the PCIe switch.

For the implicit TLP packet actively sent by the downstream port for which the DPA of the PCIe switch does not act as an agent, routing is directly performed based on the message routing subfield in the TLP packet.

When endpoint device hot swapping occurs in the downstream port for which the DPA acts as an agent, and when an interruption message packet reported by the downstream port passes by the DPA, the DPA changes the BDF according to a rule of the foregoing implicit routing, reports interruption to the processor, and triggers DPA hot swapping interrupt. The DPA performs port scanning, which is similar to the forcible scanning of device functions that is described in the foregoing embodiment. In this case, the DPA needs to forcible scanning on 256 device functions represented by device(5bits).function(3bits).

When the downstream port for which the DPA acts as the agent reports an error message packet, the DPA changes BDF of the error message packet to the BDF of the DPA, and records state information of the port in configuration space registers of the DPA and the downstream port. When receiving the error message packet, the processor traverses a configuration space register of each downstream port under the DPA, and determines, based on the recorded state of the port, a number of a downstream port in which an error is detected, so that error processing for the downstream port is performed. Specifically, the configuration space register that records the state of the port may be an AER (advanced error reporting) function register.

It should be noted that, in embodiments of this application, one or more layers of bridge devices between the processor and the PCIe switch may exist, and the processor communicates with the PCIe switch by using the bridge devices between the processor and the PCIe switch. For ease of description, an example in which the PCIe switch is directly connected to the processor (RP) is used for description in each of the foregoing embodiments of this application. It may be understood that, when a conventional PCIe bridge device exists between the processor and the PCIe switch, an intermediate PCIe bridge device may process, according to a definition of the PCIe protocol, communication between the processor and the PCIe switch according to embodiments of this application.

In embodiments of this application, to ensure compatibility with a scenario of the existing PCIe protocol, only DPA is allowed to map, to a device identity in BDF, a PCIe endpoint device connected to a downstream port for which the DPA acts as an agent, and the device identity is 5 bits. Therefore, one DPA can map PCIe endpoint devices connected to a maximum of 32 downstream ports. If a quantity of functions of a PCIe endpoint device is less than 8, a PCIe ID waste problem still exists. To resolve this problem, the device identity of the PCIe endpoint device that is connected to the downstream port and that is mapped by the DPA is expanded from 5 bits to 6 bits or 7 bits, and correspondingly, bits occupied by the function are reduced from 3 bits to 2 bits or 1 bit. In this case, a table of a quantity of PCIe endpoint device functions and a quantity of PCIe endpoint devices that is connected to the downstream port and that is mapped by the DPA is shown as the following table.

another part of the PCIe system. This has little impact on the existing system. In addition, in this embodiment of this application, a circuit unit for isolating two PCIe domains, such as an NTB, does not need to be added. Therefore, costs are low. Further, when the DPA is implemented by using an ASIC chip, performance of performing communication forwarding between an upstream port and a downstream port is high.

Figure 12:
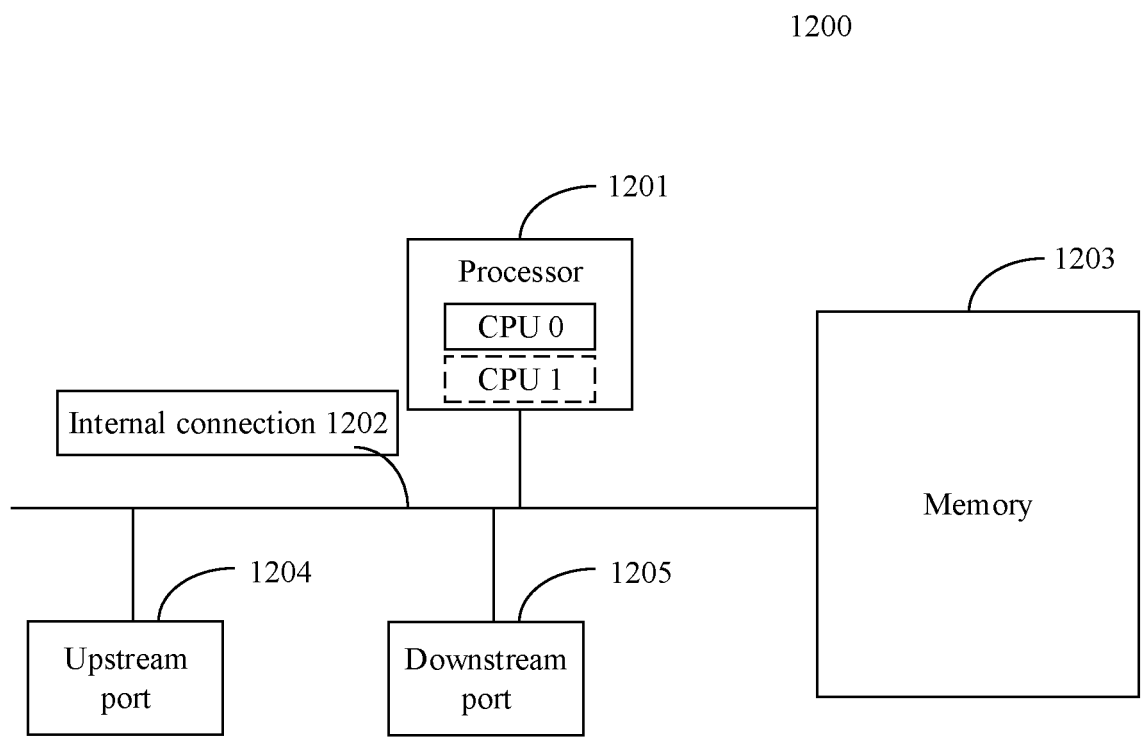
FIG. 12 is a schematic diagram of an apparatus structure of a PCIe switching device 1200 according to an embodiment of this application.

FIG. 12 is a schematic diagram of a structure of an apparatus of a PCIe switching device 1200 according to an embodiment of this application. The PCIe switching device 1200 includes a processor 1201, an internal connection 1202, an upstream port 1204, a plurality of downstream ports 1205, and a memory 1203. The processor 1201 may be a plurality of processor cores, and the processor may include a plurality of registers, configured to store configuration information of the PCIe switching device. In the PCIe switching device shown in FIG. 12, an endpoint agent apparatus (the DPA in the foregoing embodiments) may use a software module. In other words, the processor 1201 executes an instruction in the memory 1203, to implement a function of the DPA. There may be one or more upstream ports 1202.

Optionally, the processor 1201 may be a general-purpose central processing unit (central processing unit, CPU), a network processor (network processor, NP), a microprocessor, or one or more integrated circuits configured to control program execution in the solutions of this application.

The internal connection 1202 may include a path for transmitting information between the foregoing components. Optionally, the internal connection 1202 is a bus.

The memory 1203 may be a read-only memory (read-only memory, ROM) or another type of static storage device capable of storing static information and instructions, a random access memory (random access memory, RAM) or another type of dynamic storage device capable of storing information and instructions, an electrically erasable programmable read-only memory (electrically erasable programmable read-only memory, EEPROM), a compact disc read-only memory (compact disc read-only memory, CD-ROM) or another disc storage, an optical disc storage (including a compact optical disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer. The memory 1203 is not limited thereto. The memory may exist

| Quantity of bits of a device identity of a PCIe device that is connected to a downstream port and that is mapped by a DPA | Quantity of downstream ports for which a DPA acts as an agent | Quantity of PCIe device functions |
|---|---|---|
| 5 | 32 | 8 |
| 6 | 64 | 4 |
| 7 | 128 | 2 |

An embodiment of this application provides a PCIe switch including a DPA. The DPA provides an agent for a plurality of downstream ports, and presents the plurality of downstream ports to an upper-layer system as one port without changing an existing BIOS, OS, PCIe subsystem, and PCIe device driver, to reduce bus occupation and increase a quantity of endpoint devices supported by a PCIe system. Specifically, in this embodiment of this application, a DPA driver may be added without changing software of independently, and is connected to the processor by using the bus. The memory may alternatively be integrated with the processor.

The memory 1203 is configured to store application program code for performing the solutions of this application, and the processor 1201 controls the performing. The processor 1201 is configured to execute the application program code stored in the memory 1203, and cooperate with the upstream port 1204 and the downstream port 1205, so that the apparatus 1200 implements the functions described in the foregoing embodiments of this application.

In specific implementation, in an embodiment, the processor 1201 may include one or more CPUs such as a CPU 0 and a CPU 1 in FIG. 12.

During specific implementation, in an embodiment, the PCIe switching device 1200 may include a plurality of processors. Each of the processors may be a single-core (single-CPU) processor, or may be a multi-core (multi-CPU) processor. The processor herein may be one or more devices, circuits, and/or processing cores configured to process data (for example, computer program instructions).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A PCIe switching device comprising:
an upstream port;
a port agent apparatus; and
a plurality of first downstream ports,
wherein the port agent apparatus is separate from the upstream port and the first downstream ports, the upstream port is connected to the port agent apparatus, the port agent apparatus is connected to the plurality of first downstream ports, each first downstream port is configured to connect to a PCIe endpoint device, and links between the plurality of first downstream ports and PCIe endpoint devices connected to the plurality of first downstream ports share a same PCIe bus number, wherein the port agent apparatus is configured to:
receive, from the first downstream port, a data packet sent by the PCIe endpoint device; and
replace a device identity in the data packet with the number of the first downstream port.

2. The PCIe switching device according to claim 1, wherein an address window of the port agent apparatus is a collection of address windows of the first downstream ports connected to the port agent apparatus.

3. The PCIe switching device according to claim 1, wherein a number of a first downstream port indicates a device identity of a PCIe endpoint device connected to the first downstream port.

4. The PCIe switching device according to claim 1, wherein when the data packet sent by the PCIe endpoint device is a request Transaction Layer Protocol (TLP) packet, the port agent apparatus is configured to replace, with the number of the first downstream port connected to the PCIe endpoint device, a device identity in requester Bus:Device.Function (BDF) carried in the request TLP packet.

5. The PCIe switching device according to claim 1, wherein when the data packet sent by the PCIe endpoint device is a completion Transaction Layer Protocol (TLP) packet, the port agent apparatus is configured to replace, with the number of the first downstream port connected to the PCIe endpoint device, a device identity in completer Bus:Device.Function (BDF) carried in the completion TLP packet.

6. The PCIe switching device according to claim 1, wherein the port agent apparatus is configured to:
receive a data packet sent by a processor;
use a value of a device identity in the data packet as a number of a destination port that receives the data packet; and
change the device identity in the data packet to 0, and send the data packet to the destination port.

7. The PCIe switching device according to claim 6, wherein when the data packet sent by the processor is a configuration request Transaction Layer Protocol (TLP) packet, the device identity in destination Bus: Device.Function (BDF) carried in the configuration request TLP packet is replaced with 0, and when the data packet sent by the processor is a completion TLP packet, a device identity in requester BDF carried in the completion TLP packet is replaced with 0.

8. The PCIe switching device according to claim 1, wherein a sum of a quantity of bits of the device identity and a quantity of bits of a function identity of the PCIe endpoint device is 8.

9. The PCIe switching device according to claim 1, wherein configuration space registers of first downstream ports belonging to the port agent apparatus are mapped in a configuration space register of the port agent apparatus.

10. The PCIe switching device according to claim 1, wherein the port agent apparatus comprises an enable register, and a value of the enable register indicates whether an agent function of the port agent apparatus is enabled.

11. The PCIe switching device according to claim 1, wherein when the PCIe switching device is powered on or reset for initialization, the PCIe switching device is configured to set a register of the port agent apparatus by using firmware or by reading a nonvolatile memory.

12. The PCIe switching device according to claim 1, wherein the port agent apparatus is configured to:
receive a first configuration request forwarded by the upstream port, the first configuration request carrying each bus number corresponding to a management topology of the port agent apparatus;
set, based on the first configuration request, each bus number corresponding to the management topology of the port agent apparatus; and
set management topologies of all first downstream ports connected to the port agent apparatus to a same bus number.

13. The PCIe switching device according to claim 1, wherein the port agent apparatus is configured to:
receive a second configuration request sent by the processor, a bus number carried in the second configuration request is a secondary bus number of the port agent apparatus, a carried device identity is m, and m is an integer greater than or equal to 0; and
route the second configuration request to a corresponding destination port based on the value m of the device identity carried in the second configuration request, and a number of the destination port is equal to m.

14. The PCIe switching device according to claim 1, further comprising second downstream ports, wherein the second downstream ports are connected to the upstream port, and the port agent apparatus and the plurality of first downstream ports have a same subordinate PCIe bus number.

15. The PCIe switching device according to claim 14, wherein the port agent apparatus is configured to: determine, based on a port enabling record, that an agent function is enabled for the plurality of first downstream ports, and determine that an agent function is not enabled for the second downstream ports.

16. The PCIe switching device according to claim 1, wherein the port agent apparatus is further configured to:
   receive a message packet reported by the first downstream port connected to the port agent apparatus; and
   replace, with Bus: Device.Function (BDF) of the port agent apparatus, BDF of the first downstream port that is carried in the message packet, and route the message packet to the upstream port.

17. The PCIe switching device according to claim 1, wherein the PCIe switching device is connected to a root port of a processor without using a second bridge device or is connected to the root port of the processor by using the second bridge device.

18. The PCIe switching device according to claim 1, wherein the PCIe switching device comprises a plurality of parallel port agent apparatuses, and each port agent apparatus is connected to one group of the first downstream ports.

19. A method for expanding a PCIe system, comprising:
   providing a PCIe switching device, wherein the PCIe switching device comprises an upstream port, a port agent apparatus, and a plurality of first downstream ports, wherein the port agent apparatus is separate from the upstream port and the first downstream ports, and is connected to a processor of the PCIe system by using the upstream port and connected to the plurality of first downstream ports, and the first downstream port is configured to connect to a PCIe endpoint device;
   setting, by the processor by using the port agent apparatus, links between the plurality of first downstream ports and PCIe endpoint devices connected to the plurality of first downstream ports to a same PCIe bus number,
   receiving, by the port agent apparatus, from the first downstream port, a data packet sent by the PCIe endpoint device; and
   replacing, by the port agent apparatus, a device identity in the data packet with the number of the first downstream port.

20. The method according to claim 19, wherein the step of setting comprises giving the port agent apparatus and the plurality of first downstream ports a same subordinate bus number.

21. The method according to claim 19, wherein a number of a first downstream port indicates a device identity of the PCIe endpoint device connected to the first downstream port.

22. The method according to claim 19, further comprising:
   receiving, by the port agent apparatus, a data packet sent by the processor;
   using, by the port agent apparatus, a value of a device identity in the data packet as a number of a destination port that receives the data packet; and
   changing, by the port agent apparatus, the device identity in the data packet to 0, and sending the data packet to the destination port.

23. The method according to claim 19, further comprising:
   when the PCIe switching device is powered on or reset for initialization, setting, by the PCIe switching device, a register of the port agent apparatus by using firmware or by reading a nonvolatile memory.

24. The method according to claim 19, further comprising:
   receiving, by the port agent apparatus, a first configuration request forwarded by the upstream port, wherein the first configuration request carries each bus number corresponding to a management topology of the port agent apparatus; and
   setting, by the port agent apparatus based on the first configuration request, each bus number corresponding to the management topology of the port agent apparatus, and setting management topologies of all first downstream ports connected to the port agent apparatus to a same bus number.

25. The method according to claim 19, further comprising:
   receiving, by the port agent apparatus, a second configuration request sent by the processor, wherein a bus number carried in the second configuration request is a secondary bus number of the port agent apparatus, a carried device identity is m, and m is an integer greater than or equal to 0; and
   routing, by the port agent apparatus, the second configuration request to a corresponding destination port based on the value m of the device identity carried in the second configuration request, wherein a number of the destination port is equal to m.

26. The method according to claim 19, wherein the PCIe device further comprises second downstream ports, and the method further comprises:
   determining, by the port agent apparatus based on a port enabling record, that an agent function is enabled for the plurality of first downstream ports; and
   determining that an agent function is not enabled for the second downstream ports.

27. A PCIe system comprising:
   a processor;
   a PCIe switching device comprising an upstream port, a port agent apparatus, and a plurality of first downstream ports, wherein the port agent apparatus is separate from the upstream port and the first downstream ports; and
   a plurality of PCIe end devices,
   wherein the upstream port of the PCIe switching device is connected to the port agent apparatus, the port agent apparatus is connected to the plurality of first downstream ports, and each first downstream port is configured to connect to a PCIe endpoint device, and links between the plurality of first downstream ports and PCIe endpoint devices connected to the plurality of first downstream ports share a same PCIe bus number,
   wherein the port agent apparatus is configured to:
   receive, from the first downstream port, a data packet sent by the PCIe endpoint device; and
   replace a device identity in the data packet with the number of the first downstream port.

* * * * *